United States Patent
Abdulslam et al.

(10) Patent No.: US 10,069,408 B2
(45) Date of Patent: Sep. 4, 2018

(54) SWITCHED CAPACITOR CIRCUIT MODIFYING VOLTAGE ON THE INDUCTOR OF A BUCK REGULATOR

(71) Applicant: The American University in Cairo, New York, NY (US)

(72) Inventors: Abdallah Amgad Abdulslam, New Cairo (EG); Yehea Ismail, New Cairo (EG)

(73) Assignee: The American University in Cairo, New York, NY (US)

( * ) Notice: Subject to any disclaimer, the term of this patent is extended or adjusted under 35 U.S.C. 154(b) by 0 days.

(21) Appl. No.: 15/117,236

(22) PCT Filed: Feb. 12, 2015

(86) PCT No.: PCT/US2015/015696
§ 371 (c)(1),
(2) Date: Aug. 8, 2016

(87) PCT Pub. No.: WO2015/123459
PCT Pub. Date: Aug. 20, 2015

(65) Prior Publication Data
US 2016/0352219 A1  Dec. 1, 2016

Related U.S. Application Data

(60) Provisional application No. 61/940,337, filed on Feb. 14, 2014.

(51) Int. Cl.
*H02M 3/07* (2006.01)
*H02M 1/08* (2006.01)
*H02M 1/00* (2006.01)

(52) U.S. Cl.
CPC ............... *H02M 3/07* (2013.01); *H02M 1/08* (2013.01); *H02M 2001/0003* (2013.01)

(58) Field of Classification Search
CPC ....... H02M 3/07–2003/078; H02M 2001/0003
See application file for complete search history.

(56) References Cited

U.S. PATENT DOCUMENTS

| | | |
|---|---|---|
| 6,225,795 B1 | 5/2001 | Stratakos |
| 2012/0212293 A1 | 8/2012 | Khlat |

(Continued)

FOREIGN PATENT DOCUMENTS

WO   WO2013191757   12/2013

*Primary Examiner* — Gary L Laxton
*Assistant Examiner* — Peter Novak
(74) *Attorney, Agent, or Firm* — Lumen Patent Firm

(57) ABSTRACT

A voltage regulator provides a regulated output voltage [108] from an input voltage [100] using control unit [106] to control a switched capacitor circuit [102] to periodically produce different output voltage levels Vx followed by a low pass filter [104] to give a regulated output voltage. Phase interleaving is used where the phases of different voltage levels are interleaved allowing for increased effective switching frequency and reduced switching losses. By controlling the average voltage on the flying capacitors, output voltage is regulated by modulating the resistance of the switches using a duty cycle. A control unit [106] is used to determine the operation region of the voltage regulator device and configure the switched capacitor circuit in each operation region. The controller contains a state machine that determines the switches configuration in each phase of a complete switching cycle.

16 Claims, 22 Drawing Sheets

(56) References Cited

U.S. PATENT DOCUMENTS

| | | | | |
|---|---|---|---|---|
| 2013/0234513 A1* | 9/2013 | Bayer | ................... | G05F 1/577 |
| | | | | 307/31 |
| 2014/0070787 A1* | 3/2014 | Arno | ................... | H02M 3/07 |
| | | | | 323/304 |
| 2014/0084890 A1* | 3/2014 | Philip | ................... | H02M 1/146 |
| | | | | 323/284 |
| 2015/0207401 A1* | 7/2015 | Zhang | ................... | H02M 3/158 |
| | | | | 323/271 |
| 2016/0190921 A1* | 6/2016 | Kumar | ................... | H02M 3/158 |
| | | | | 323/271 |
| 2017/0055322 A1* | 2/2017 | Jiang | ................... | H02M 3/07 |

\* cited by examiner

| Region | First operation region: 0.67Vin < Vo < Vin | | | | |
|---|---|---|---|---|---|
| Time Slot | T1 | T2 | T3 | T4 | T1 |
| S1 | On | On | On | Off | On |
| S2 | On | Off | On | On | On |
| S3 | Off | On | Off | Off | Off |
| S4 | Off | Off | Off | Off | Off |
| S5 | On | On | On | Off | On |
| S6 | Off | Off | Off | Off | Off |
| S7 | Off | On | Off | Off | Off |
| S8 | Off | Off | Off | On | Off |
| S9 | Off | Off | Off | On | Off |
| Voltage Level | Vin | 0.67 Vin | Vin | 0.67 Vin | Vin |
| C1 | -- | ↑ | -- | ↓ | -- |
| C2 | -- | ↑ | -- | ↓ | -- |
| Region | Second operation region: 0.33Vin < Vo < 0.67Vin | | | | |
| Time Slot | T1 | T2 | T3 | T4 | T1 |
| S1 | On | On | Off | Off | On |
| S2 | Off | Off | On | On | Off |
| S3 | On | Off | Off | Off | On |
| S4 | Off | Off | Off | On | Off |
| S5 | On | Off | Off | Off | On |
| S6 | Off | Off | Off | On | Off |
| S7 | On | On | Off | Off | On |
| S8 | Off | Off | On | On | Off |
| S9 | Off | On | On | Off | Off |
| Voltage Level | 0.67 Vin | 0.33 Vin | 0.67 Vin | 0.33 Vin | 0.67 Vin |
| C1 | ↑ | ↑ | ↓ | ↓ | ↑ |
| C2 | ↑ | ↑ | ↓ | ↓ | ↑ |
| Region | Third operation region: 0 < Vo < 0.33Vin | | | | |
| Time Slot | T1 | T2 | T3 | T4 | T1 |
| S1 | On | Off | Off | Off | On |
| S2 | Off | Off | On | Off | Off |
| S3 | Off | Off | Off | Off | Off |
| S4 | Off | On | On | On | Off |
| S5 | Off | Off | Off | Off | Off |
| S6 | Off | Off | On | Off | Off |
| S7 | On | On | Off | On | On |
| S8 | Off | On | On | On | Off |
| S9 | On | Off | Off | Off | On |
| Voltage Level | 0.33 Vin | 0 | 0.33 Vin | 0 | 0.33 Vin |
| C1 | ↑ | -- | ↓ | -- | ↑ |
| C2 | ↑ | -- | ↓ | -- | ↑ |

*Fig. 10*

| Region | Vo = 0.67Vin | | | | |
|---|---|---|---|---|---|
| Time Slot | T1 | T2 | T3 | T4 | T1 |
| Switches Configuration S1 | On → | Off → | On → | Off → | On |
| S2 | Off → | On → | Off → | On → | Off |
| S3 | On → | Off → | On → | Off → | On |
| S4 | Off | Off | Off | Off | Off |
| S5 | On → | Off → | On → | Off → | On |
| S6 | Off | Off | Off | Off | Off |
| S7 | On → | Off → | On → | Off → | On |
| S8 | Off → | On → | Off → | On → | Off |
| S9 | Off → | On → | Off → | On → | Off |
| Voltage Level | 0.67 Vin | 0.67 Vin | 0.67 Vin | 0.67 Vin | 0.67 Vin |
| Caps C1 | ↑ | ↓ | ↑ | ↓ | ↑ |
| C2 | ↑ | ↓ | ↑ | ↓ | ↑ |
| Region | Vo = 0.33Vin | | | | |
| Time Slot | T1 | T2 | T3 | T4 | T1 |
| Switches Configuration S1 | On → | Off → | On → | Off → | On |
| S2 | Off → | On → | Off → | On → | Off |
| S3 | Off | Off | Off | Off | Off |
| S4 | Off → | On → | Off → | On → | Off |
| S5 | Off | Off | Off | Off | Off |
| S6 | Off → | On → | Off → | On → | Off |
| S7 | On → | Off → | On → | Off → | On |
| S8 | Off → | On → | Off → | On → | Off |
| S9 | On → | Off → | On → | Off → | On |
| Voltage Level | 0.33 Vin | 0.33 Vin | 0.33 Vin | 0.33 Vin | 0.33 Vin |
| Caps C1 | ↑ | ↓ | ↑ | ↓ | ↑ |
| C2 | ↑ | ↓ | ↑ | ↓ | ↑ |

*Fig. 11*

| Region | First operation region: 0.75Vin < Vo < Vin | | | | | | | |
|---|---|---|---|---|---|---|---|---|
| Time Slot | T1 | T2 | T3 | T4 | T5 | T6 | T7 | T8 |
| On switches | S1<br>S5<br>S6 → S7 | S1<br>S5<br>S7 → S6 | S1<br>S5 → S8<br>S6 | S1<br>S8 → S5<br>S6 | S1<br>S5<br>S6 → S7 | S1<br>S5<br>S7 → S6 | S1<br>S5 → S3<br>S6 | S2<br>S3<br>S6 |
| Voltage Level | Vin | 0.75 Vin | Vin | 0.75 Vin | Vin | 0.75 Vin | Vin | 0.75 Vin |
| C1 | - | - | - | ↑ | - | - | - | ↓ |
| C2 | - | ↑ | - | ↓ | - | ↑ | - | ↓ |
| Region | Second operation region: 0.5Vin < Vo < 0.75Vin | | | | | | | |
| Time Slot | T1 | T2 | T3 | T4 | T5 | T6 | T7 | T8 |
| On switches | S1<br>S5<br>S7 | S1<br>S8<br>S7 | S1<br>S8<br>S6 | S1<br>S8<br>S7 | S1<br>S5<br>S7 | S2<br>S5<br>S6 | S2<br>S3<br>S6 | S2<br>S5<br>S6 |
| Voltage Level | 0.75 Vin | 0.5 Vin | 0.75 Vin | 0.5 Vin | 0.75 Vin | 0.5 Vin | 0.75 Vin | 0.5 Vin |
| C1 | - | ↑ | ↑ | ↑ | - | ↓ | ↓ | ↓ |
| C2 | ↑ | - | ↓ | - | ↑ | - | ↓ | - |
| Region | Third operation region: 0.25Vin < Vo < 0.5Vin | | | | | | | |
| Time Slot | T1 | T2 | T3 | T4 | T5 | T6 | T7 | T8 |
| On switches | S1<br>S8<br>S7 | S2<br>S5<br>S7 | S1<br>S8<br>S7 | S2<br>S8<br>S6 | S2<br>S5<br>S6 | S1<br>S4<br>S7 | S2<br>S5<br>S6 | S2<br>S8<br>S6 |
| Voltage Level | 0.5 Vin | 0.25 Vin | 0.5 Vin | 0.25 Vin | 0.5 Vin | 0.25 Vin | 0.5 Vin | 0.25 Vin |
| C1 | ↑ | ↓ | ↑ | - | ↓ | ↑ | ↓ | - |
| C2 | - | ↑ | - | ↓ | - | ↑ | - | ↓ |
| Region | Fourth operation region: 0 < Vo < 0.25Vin | | | | | | | |
| Time Slot | T1 | T2 | T3 | T4 | T5 | T6 | T7 | T8 |
| On switches | S2<br>S5<br>S7 | S2<br>S8<br>S7 | S2<br>S8<br>S6 | S2<br>S8<br>S7 | S1<br>S4<br>S7 | S2<br>S8<br>S7 | S2<br>S8<br>S6 | S2<br>S8<br>S7 |
| Voltage Level | 0.25 Vin | 0 | 0.25 Vin | 0 | 0.25 Vin | 0 | 0.25 Vin | 0 |
| C1 | ↓ | - | - | - | ↑ | - | - | - |
| C2 | ↑ | - | ↓ | - | ↑ | - | ↑ | - |

*Fig. 16*

SWITCHED CAPACITOR CIRCUIT MODIFYING VOLTAGE ON THE INDUCTOR OF A BUCK REGULATOR

CROSS-REFERENCE TO RELATED APPLICATIONS

This application is a 371 of PCT/US2015/015696 filed on Feb. 12, 2015. PCT/US2015/015696 filed on Feb. 12, 2015 claims the benefit of U.S. Provisional Application 61/940,337 filed on Feb. 14, 2014

FIELD OF THE INVENTION

The present invention relates generally to voltage regulator devices (also known as DC-DC converters) and methods for operating them. More particularly, the invention relates to DC-DC converters capable of providing step-up, step-down or step-up/down conversions.

BACKGROUND OF THE INVENTION

Modern microprocessors have many cores integrated on one chip. Each core is preferred to operate at a different supply voltage domain to support the dynamic voltage and frequency scaling feature. This means each core requires a separate voltage regulator that has high efficiency over a wide range of output voltage levels. Integration of high efficiency voltage regulators on chip is a challenge.

While normal switched capacitor voltage regulators (SCVRs) are easy integrable, they are suffering from charge sharing losses as well as fast degradation of efficiency when deviating from the target operation point. On the other hand, conventional buck converters suffer from large magnetic components that introduce challenges to integrate on chip. A voltage regulator device that has the advantages of both the SCVR and the buck converters would be a needed improvement in the art.

SUMMARY OF THE INVENTION

In one aspect, embodiments of the invention include a voltage regulator having a switched capacitor circuit (SCC) capable of switching its output voltage periodically between two or more voltage levels, thus providing a smaller voltage drop on the inductor. The voltage regulator devices include a switched capacitor circuit (e.g., using flying capacitors) that takes an input voltage and is capable of providing different voltage levels. The switched capacitor circuit is followed by a low pass filter to give a regulated output voltage. The switched capacitor circuit is configured to switch its output periodically between several different voltage levels (e.g., adjacent levels) allowing for smaller inductor sizes and smaller capacitor sizes without degrading the performance. The device can be used for DC-DC power conversion both on-chip and off-chip, and used to provide a regulated DC output voltage to power electronic circuits. In one embodiment, the invention is capable of providing three types of voltage conversion that include step-up, step down and step-up/down conversions.

In a further aspect, embodiments of the invention include methods for operating voltage regulators using a phase interleaving technique where a complete switching cycle is divided into a predetermined number of time slots, e.g., double the maximum number of phases, providing any voltage level of the SCC. Each time slot is assigned one of the phases of two or more different conversion ratios. Given a certain desired output voltage range, some phase sequences lead to a reduced number of switching MOSFETs during a complete switching cycle which in turn reduce switching losses. In addition, some phase sequences lead to lower stress on switching capacitors allowing for smaller capacitor sizes and less charge sharing losses. Preferable conditions and constraints for proper operation of the circuit under this method are also provided. Interleaving the phases of different voltage levels increases the effective switching frequency of the circuit and reduces switching losses.

Embodiments of the invention also include methods for controlling the average voltage on the flying capacitors to balance a flying capacitor in a multilevel multistate voltage regulator. This method allows for regulating the output voltage by modulating the resistance of the switches using a duty cycle. The average voltage on the flying capacitor becomes dependent on the duty cycle of the switches driving waveforms due to the existence of an inductor in the path from the input to the output. This allows the flying capacitor to deviate from its normal balance values. As a result of that, a voltage waveform of two different voltage levels is generated at the input of the inductor. The low pass filter following the switched capacitor circuit takes the average of this voltage waveform generating a regulated output voltage. As the duty cycle changes, the average voltage on the flying capacitor changes and so does the output voltage. The dependency of the flying capacitor voltage on the duty cycle increases as the inductor size increases. This allows for a wider range of accessible output voltage values while the duty cycle goes from minimum to maximum. There is a certain duty cycle value which gives the maximum output voltage, the maximum efficiency and the minimum output voltage ripples. Specifically, for a 2:1 topology used as an example, the duty cycle value is 0.5 and the corresponding maximum output voltage is 0.5 Vin.

Embodiments of the invention include a controller for operating the voltage regulator device. A controller structure has switch configurations for the switched capacitor circuit. The operation timeline of the switched capacitor circuit is divided into phases each with its duration. Power conversion is done by charging/discharging storage elements like capacitors and inductors. A control unit is used to determine the operation region of the voltage regulator device and configure the switched capacitor circuit in each operation region. The controller contains a state machine that determines the switches configuration in each phase of a complete switching cycle.

Advantageously, embodiments of the invention fills the gap between inductor-based voltage regulators and capacitor-based voltage regulators. While each type of these voltage regulators has its advantages and disadvantages, the voltage regulator according to embodiments of the current invention takes the advantages of both regulator types, while avoiding or minimizing their disadvantages. The voltage regulator according to one embodiment is a general structure where many specific voltage regulators targeting different applications can be built based on the principles of the general structure. In one aspect, the voltage regulator is assigned with a controlling technique that helps in a further boost of its performance that can be considered as an optimum solution for challenges and requirements of modern voltage regulators.

Advantageously, embodiments of the voltage regulator have small passive components, making it an integrable on-chip device that consumes less area off-chip. These aspects enable electronic devices with smaller size. For modern processors, the trend is to increase the number of cores on the chip, where each core needs a separate voltage regulator to support the dynamic voltage and frequency-scaling feature. Embodiments of the current invention provide a regulator that is integrable on chip and with high efficiency.

Some exemplary applications of the invention include energy harvesting systems (e.g., solar energy harvesting for wireless sensor networks), on-chip power management (e.g. multi-core processors), off-chip power management for electronic systems, and power management for System-on-Chips (SoCs). Applications also include high power applications like solar energy systems for homes.

BRIEF DESCRIPTION OF THE DRAWINGS

FIG. 10 is a table illustrating three different operation regions of the 4-level 4-state voltage regulator device of FIG. 9.

FIG. 11 is a table illustrating the different operation regions of a conventional triple-ratio SCC known in the art.

FIG. 16 is a table illustrating the different operation regions of the 5-level 8-state voltage regulator device of FIG. 15.

DETAILED DESCRIPTION

A multilevel multistate voltage regulator design according to principles of the present invention is described in detail below with references to FIGS. 1-3. This design uses a switched capacitor circuit (SCC) to switch between different levels in different phase and the use of an inductor and the use of a duty cycle control with switch cap to get arbitrary output voltage. In the general case, the SCC switches its output between any number of voltage levels periodically. In one example, the SCC is switching its output periodically between two voltage levels. A method for operating DC-DC converters by phase interleaving technique is also described below in relation to FIGS. 4-5. This method for interleaving phases and clocks reduces power consumption. In general, the phases of any number of voltage levels may be interleaved. In one example, the phases of two voltage levels are interleaved. A method to operate DC-DC converters by resistance modulation of switches using a duty cycle is also described below in relation to FIGS. 6-8. This switch resistance modulation method uses the duty cycle to regulate the output of the voltage regulator. An illustrative embodiment of a 4-level 4-state voltage regulator implementing the general principles of a multilevel multistate voltage regulator device and phase interleaving technique is described below in relation to FIGS. 9-14. Another such illustrative embodiment of a 5-level 8-state voltage regulator implementing the general multilevel multistate voltage regulator device and phase interleaving is described in relation to FIGS. 15-17, and a digital controller for this illustrative voltage regulator device is described below in relation to FIG. 18.

Figure 1:
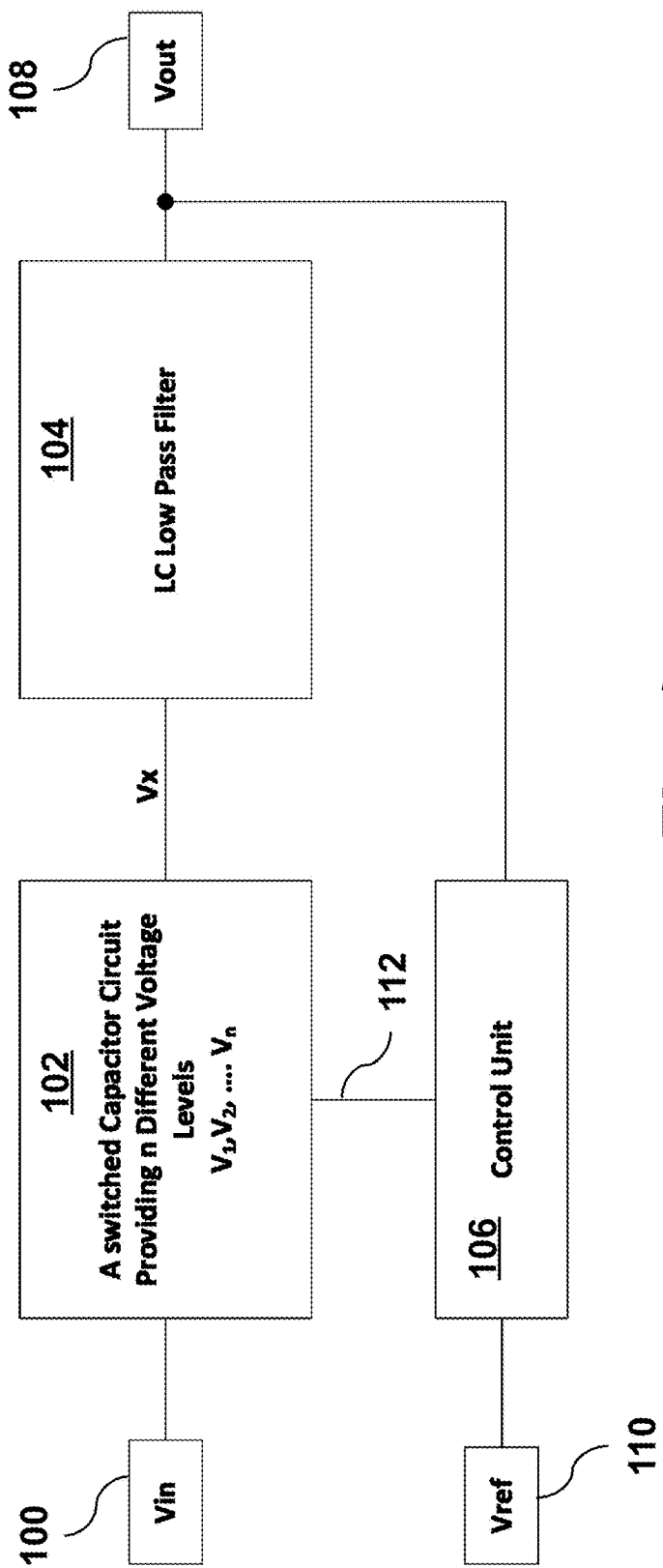
FIG. 1 is a bock diagram of a multilevel multistate voltage regulator device according to an embodiment of the invention.

FIG. 1 shows a high-level block diagram of a multilevel multistate voltage regulator device according to an embodiment of the invention. The device includes three main blocks: a switched capacitor circuit (SCC) 102, a low pass filter (LPF) 104 and a controller 106. Block 102 is a multi-ratio switched capacitor circuit (SCC) that is capable of delivering two or more different output voltage levels V1, V2, ..., Vn from an input voltage Vin 100. The switched capacitor circuit (SCC) 102 is periodically switching its output between different voltage levels V1, V2, ..., Vn, generating a switching voltage waveform Vx at its output. The block 104 is a low pass filter that takes the average of the voltage waveform Vx at its input and provides a regulated output voltage Vout 108. Block 104 includes an inductor (L) followed by an output capacitor (decoupling capacitor). Block 106 is a controller that is responsible for generating the different configurations for the SCC along the operation timeline of the voltage regulator. The controller takes the output voltage Vout 108 and the target reference voltage Vref 110 (representing the desired output voltage) as an input and generates switch driving waveforms 112 as an output. This device provides a high roughly-constant efficiency (i.e., between 70% and 90%) over most of the operation range with low output ripples (i.e., lower than 30 mV) with respect to other devices in the art. This aspect helps in saving the power consumption of the electronic device in different operation modes, such as sleep mode.

The SCC 102 includes a combination of switches and flying capacitors. Each of the voltage levels V1, V2, ..., Vn is produced by a certain conversion ratio where each conversion ratio corresponds to certain phases (i.e., configurations for the SCC) to provide this voltage level. The voltage levels that the SCC produces may include the two power supply rails (i.e., Vin and Ground) which may be provided by a direct connection between input and output nodes of the SCC without any flying capacitors involved in the charge transferring process.

The LC Low Pass Filter (LPF) 104 includes an inductor (L) and a decoupling output capacitor (Co) of the voltage regulator. The decoupling output capacitor works on reducing the output voltage ripples. The low pass filter block 104 does not have any regulation capability (i.e., no switches); it just takes the average of the switching voltage waveform generated at its input.

The voltage regulator device of FIG. 1 can be used to build step-up, step-down or step up/down DC-DC converters. For a step-up converter, the voltage levels the SCC produces are higher than or equal to the input voltage. In a step-down converter, the SCC produces voltage levels lower than or equal to the input voltage where the highest voltage level is considered to be the input voltage and the lowest voltage level is considered to be the ground. In a step-up/down converter, some voltage levels are higher than the input voltage and some are lower.

Figure 2:
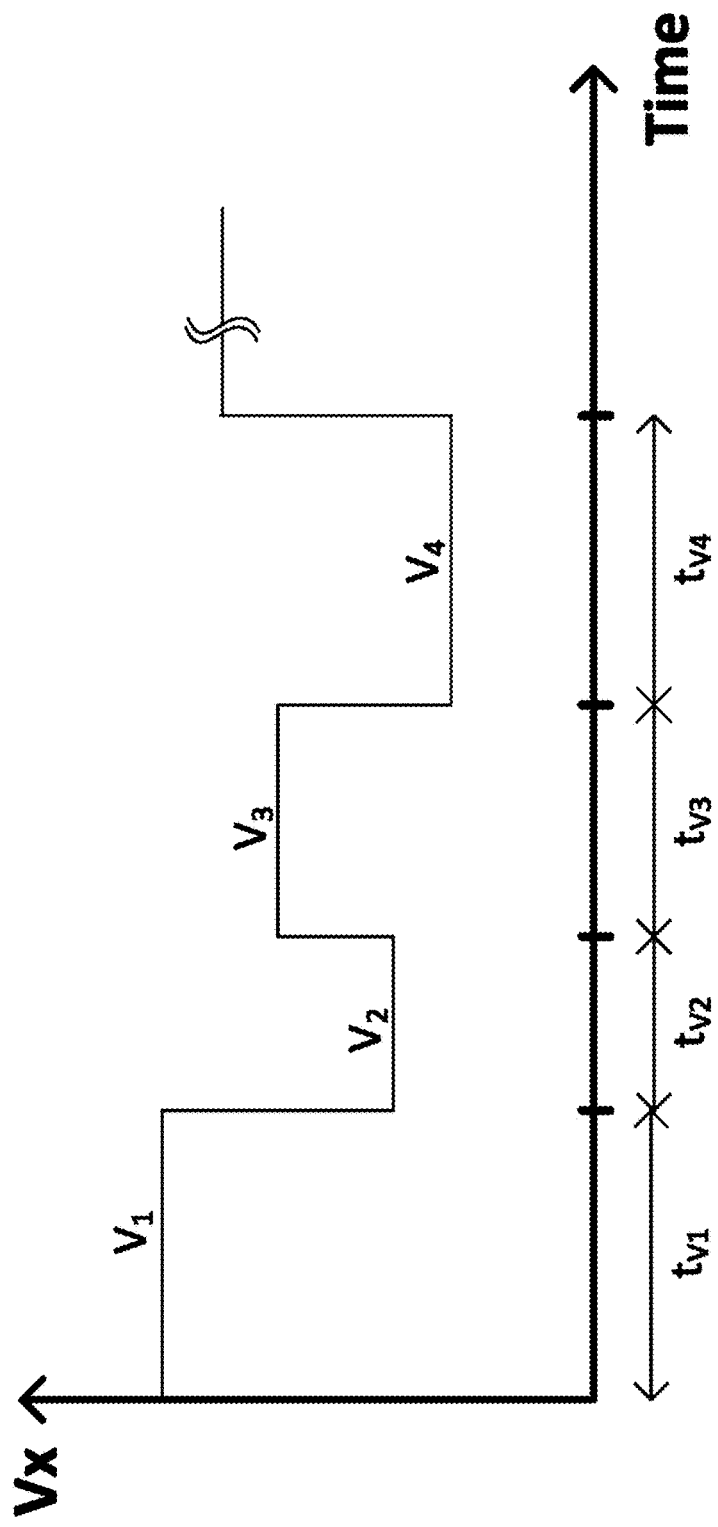
FIG. 2 is a graph of voltage vs. time illustrating a switching voltage waveform Vx generated at the output of the switched capacitor circuit of FIG. 1.

FIG. 2 is an example graph of voltage vs. time illustrating a switching voltage waveform Vx generated at the output of the switched capacitor circuit of FIG. 1 resulting from periodically switching the output voltage level between four different voltage levels V1, V2, V3, V4, according to an embodiment of the invention. The voltage levels V1, V2, V3 and V4 are produced with durations of tv1, tv2, tv3, and tv4, respectively, as configured through the controller. The sum of tv1, tv2, tv3 and tv4 is equal to one switching period (Tsw). The durations tv1, tv2, tv3, and tv4 are adjusted such that the average of the switching voltage waveform Vx is equal to the desired output voltage (Vout) as follows:

$$V1(Tv1/Tsw)+V2(Tv2/Tsw)+V3(Tv3/Tsw)+V4(Tv4/Tsw)=Vout$$

The LPF takes the average of the switching voltage waveform, producing the regulated desired output voltage Vout.

Figure 3:
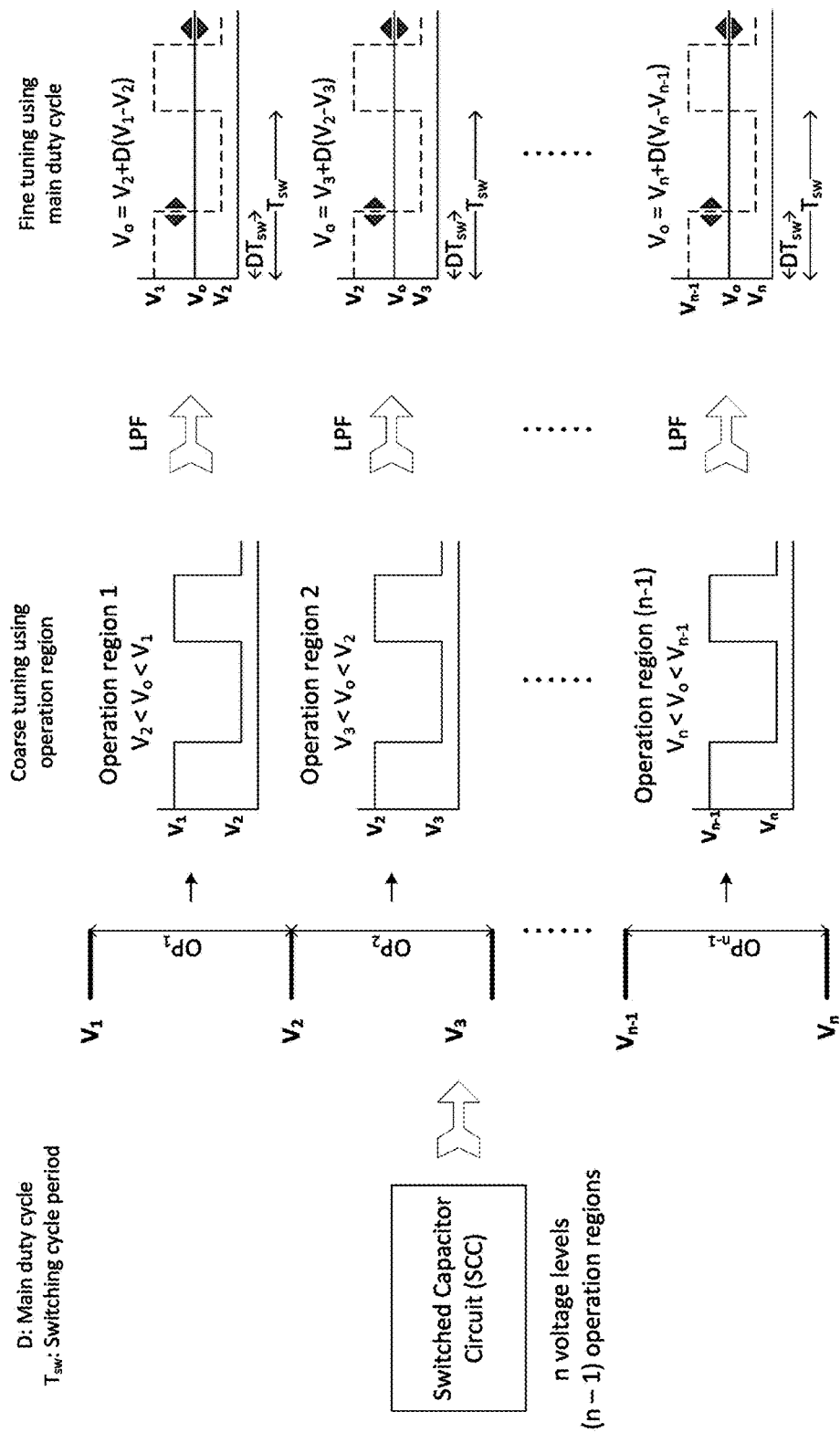
FIG. 3 is an illustration of a working principle of the multilevel multistate voltage regulator device of FIG. 1.

FIG. 3 is an illustration for the working principle of the multilevel multistate voltage regulator device of FIG. 1, showing different operation regions of the regulator, according to an embodiment of the invention. In this illustrated example, the SCC is configured to switch its output voltage between two adjacent voltage levels periodically. Accordingly, for a SCC capable of providing n voltage levels that may include the two power supply rails, there are (n−1) different operation regions the regulator can be configured to work at. In the first operation region (OP1), the SCC is configured to change its output voltage between V1 and V2 periodically. In the Second operation region (OP2), the SCC is configured to change its output voltage periodically between V2 and V3 voltage levels, and so on. In the last operation region (OPn−1), the SCC is configured to change its output voltage level periodically between Vn−1 and Vn voltage levels. In each of the (n−1) operation regions, the desired output voltage of the regulator (Vout) lies between the two voltage levels of that operation region. Therefore, the selection of the desired operation region is considered a coarse tuning of the output voltage, as illustrated in the central column of the figure. The switching voltage waveform (Vx) produced by the SCC in each operation region is averaged by passing through the LPF, resulting in a regulated output voltage (Vout). As shown in the right column of the figure, fine tuning of the output voltage value inside each operation region may be performed through the adjustment of a duty cycle value (D) which controls the relative duration between the two voltage levels of each operation region.

When the SCC is configured to switch its output periodically between two adjacent voltage levels where the desired output voltage lies in between, the maximum voltage drop on the inductor of the LPF is reduced. This may result in a reduction in the peak-to-peak current ripples in the inductor which, in this case, would be given by $\Delta IL=[(V2-V1)D(1-D)]/[L \cdot Fsw]$, where V1, V2 are the two voltage levels between which the SCC is configured to switch, D is the duty cycle which represents the relative duration between the duration of the higher voltage level with respect to the switching period (Tsw), and L is the inductor size of the LPF. The reduction in the peak-to-peak current ripples in the inductor results in reduced conduction losses of the regulator and can result in a reduction of the inductor size used in the LPF.

Figure 4A:
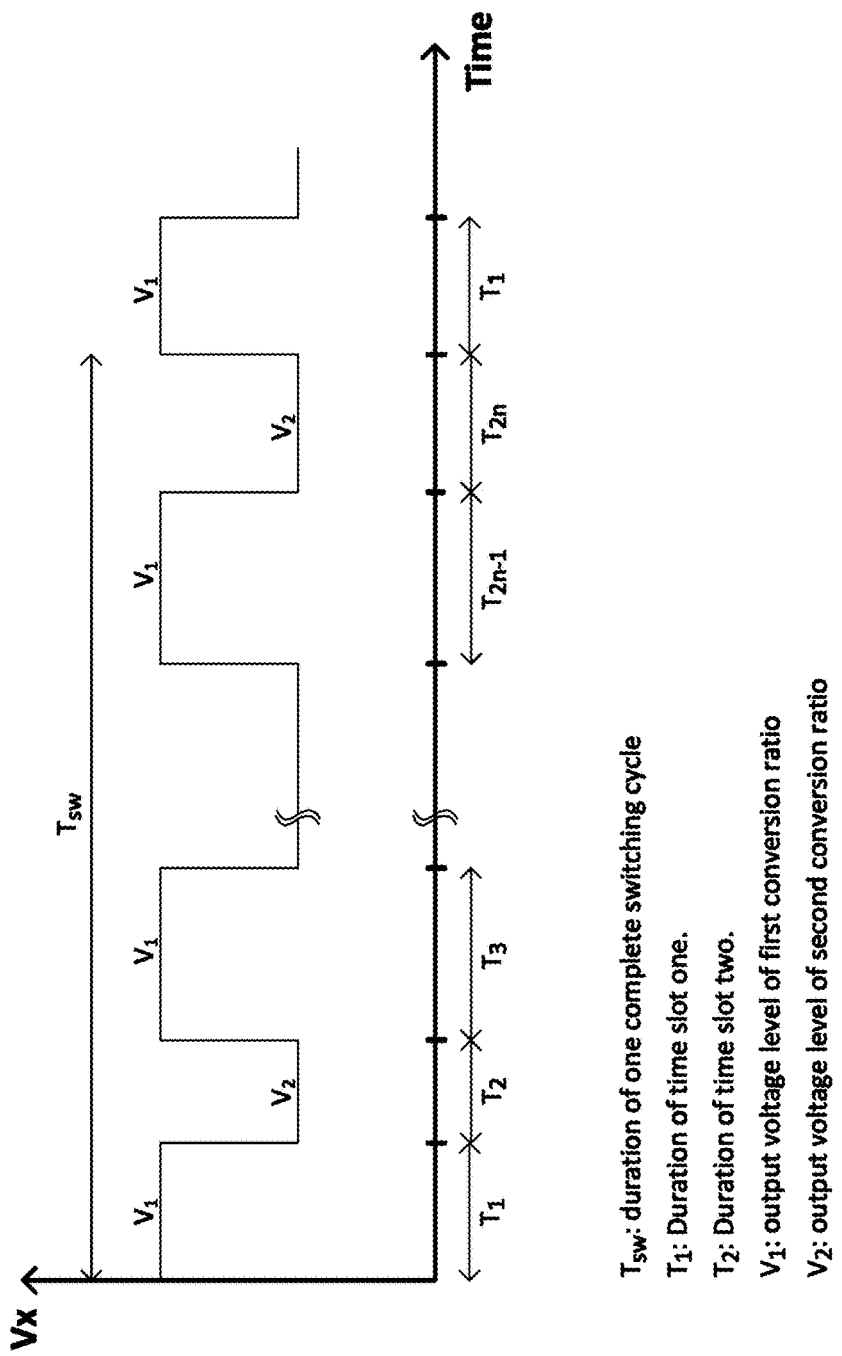
FIG. 4A is a graph of voltage vs. time illustrating a voltage waveform generated at the output of the switched capacitor circuit of FIG. 1.
Figure 4B:
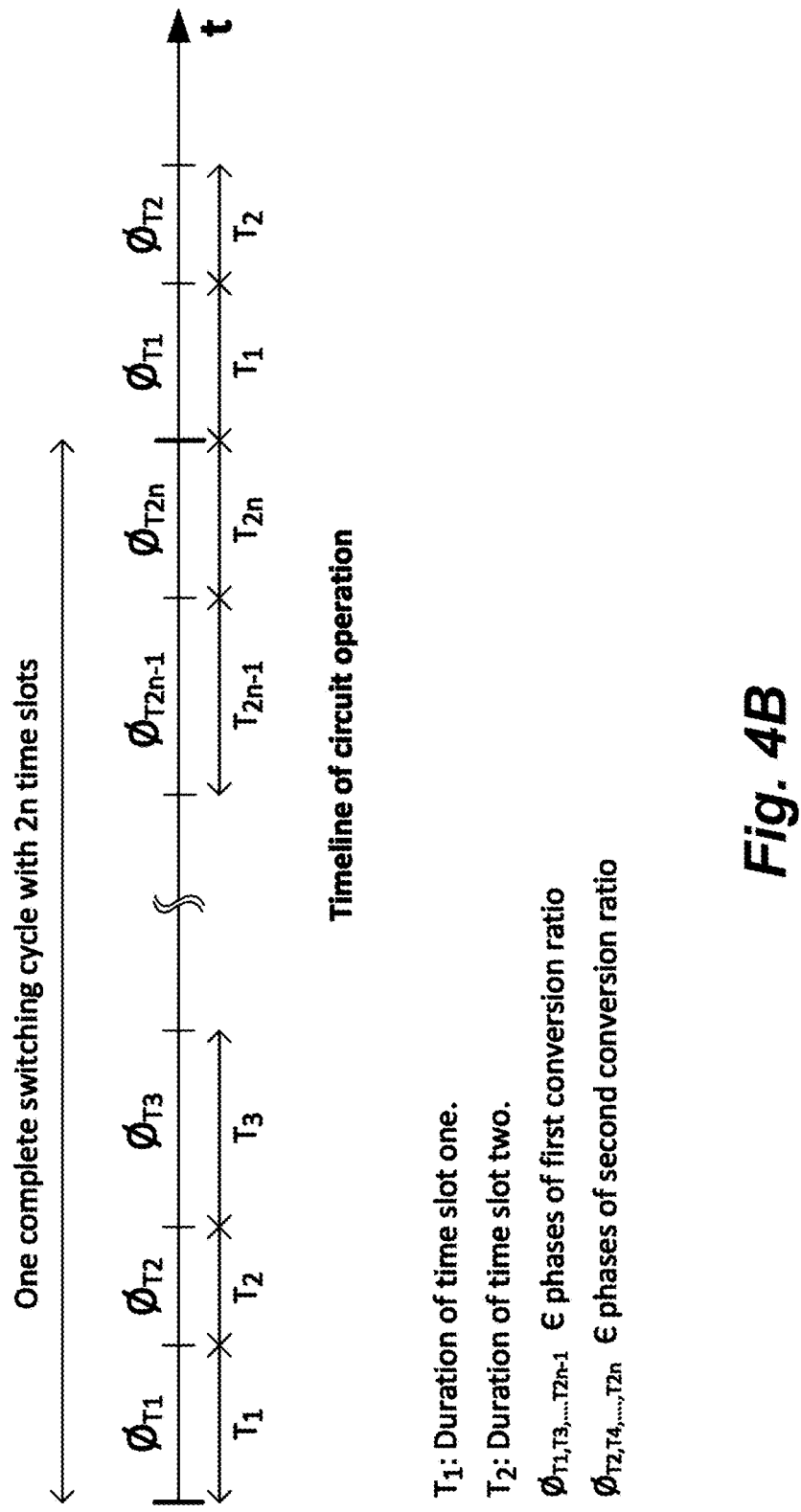
FIG. 4B is a timeline illustrating a phase interleaving method between two conversion ratios, according to an embodiment of the invention.

FIGS. 4A-B illustrate aspects of applying the phase interleaving technique to the voltage regulator device in FIG. 1 when the SCC is configured to switch its output periodically between two adjacent voltage levels V1 and V2. Under the phase interleaving technique, the operation timeline of the regulator has several switching cycles repeated as long as the circuit stays in some operation region. One switching cycle has a duration period (Tsw) equal to one over the main switching frequency of the regulator (Fsw) and is divided into a number of time lots (or states) where each state is assigned to a certain phase from the SCC. Each time slot (or state) has its relative duration to the main switching cycle duration (Tsw).

FIG. 4A is a graph of voltage vs. time illustrating the voltage waveform generated at the output of the switched capacitor circuit of FIG. 1, illustrating a case where the SCC is switching between two adjacent voltage levels (V1 and V2), resulting from interleaving between different phases of two conversion ratios, according to an embodiment of the invention. FIG. 4B is a timeline illustrating a phase interleaving method between two conversion ratios, according to an embodiment of the invention.

For the case where the SCC is configured to switch between two voltage levels V1 and V2 periodically as shown in FIG. 4A, the operation timeline of the regulator is divided into 2n time slots where n represents the maximum number of phases required to provide either V1 or V2, as indicated in FIG. 4B. The odd time slots of the switching cycle are assigned to phases providing the first voltage level V1 while the even time slots of the switching cycle are assigned to phases providing the second voltage level V2. The summation of the odd time slots (T1, T3, ..., T2n−1) is equal to the total duration of the first voltage level V1 inside a one switching cycle and is given by T1+T3+ ... +T2n−1=DTsw, where D is the duty cycle representing the relative duration of the first voltage level to the duration of one switching cycle (Tsw). The summation of the even time slots (T2, T4, ..., T2n) is equal to the total duration of the second voltage level inside a one switching cycle and is given by T2+T4+ . . . +T2n=(1−D)Tsw. If one voltage level is provided by a number of phases higher than that of the other voltage level, some of the phases of the other voltage levels are repeated in the switching cycle until the total number of phases providing each voltage level are equal.

Figure 5:
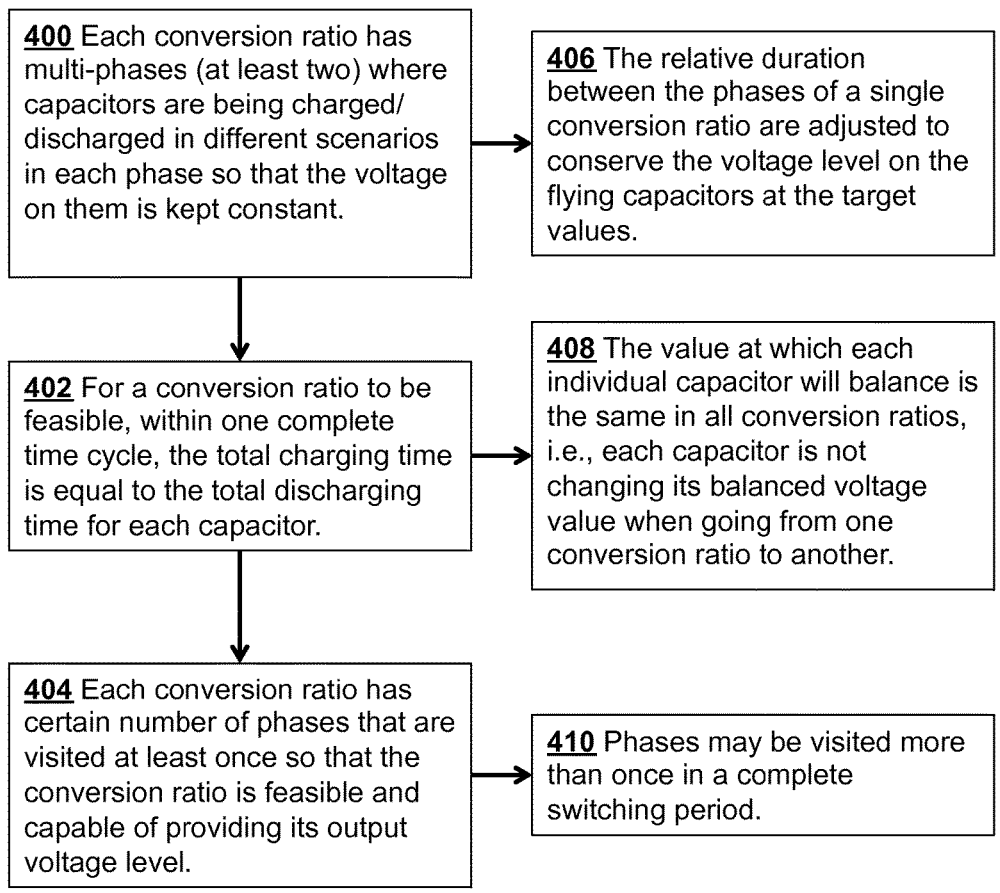
FIG. 5 is a flow diagram illustrating the inter-relationships between various operating conditions and constraints, according to an embodiment of the invention.

FIG. 5 is a flow diagram illustrating the inter-relationships between various operating conditions and constraints, according to an embodiment of the invention. The figure provides guidelines 400, 402, 404, 406, 408, 410 for selecting a proper SCC topology for the voltage regulator device in FIG. 1 and assigning the phases of its different voltage levels to different timeslots of the switching cycle. It should be noted that the SCC topology in FIG. 1 may be selected from one of the switched capacitor circuit topologies known in the art (e.g., Series-Parallel topology, Ladder topology, Dickson topology, etc.), provided it satisfies appropriate conditions, as illustrated in FIG. 5. The phases of different voltage levels of the SCC topology are assigned to the switching cycle in a way that keeps the flying capacitor balanced at their target values by following the guidelines mentioned in FIG. 5.

Figure 6A:
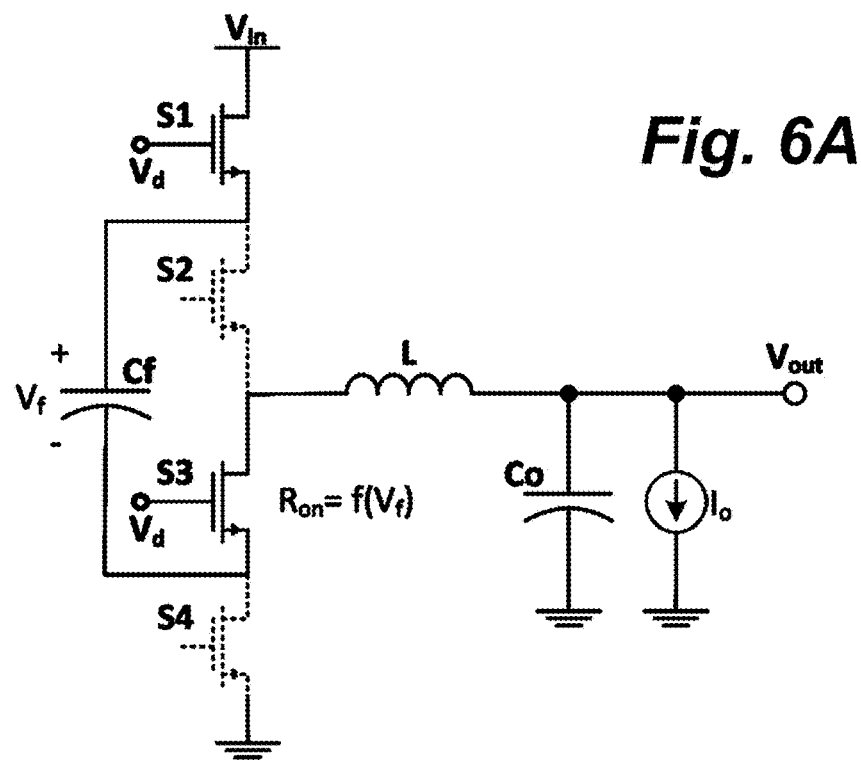
FIGS. 6A-B show first and second phases of the voltage regulator operation in which the flying capacitor is charging and discharging, according to an embodiment of the invention.
Figure 6B:
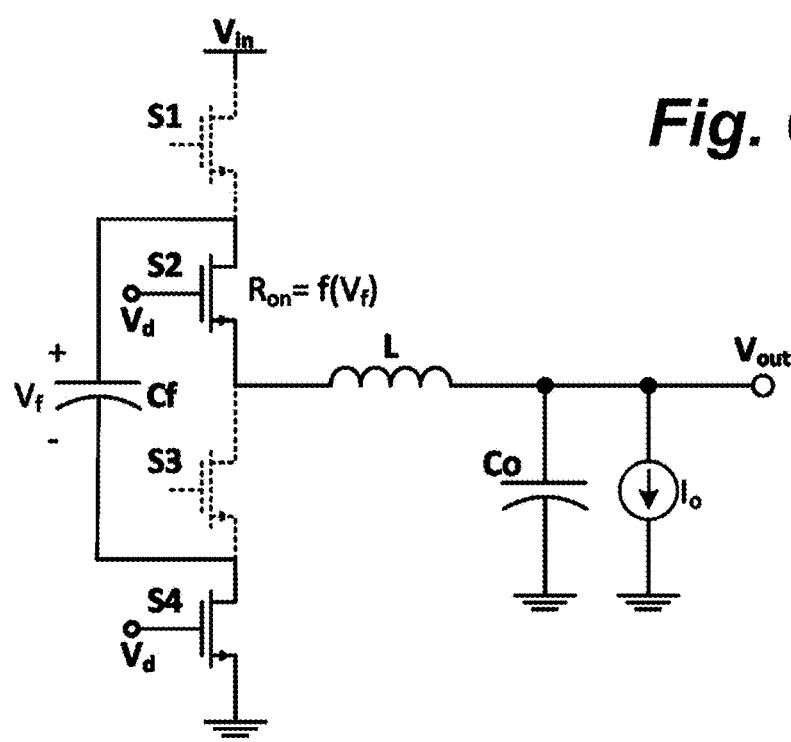

FIGS. 6A and 6B are schematic circuits that illustrate a technique for controlling the output voltage of a voltage regulator device through the resistance modulation of switches by controlling the flying capacitor average voltage in the two phases of a 2:1 conversion ratio, according to an embodiment of the invention. The circuit includes four MOSFET switches: S1, S2, S3 and S4 and one flying capacitor (Cf) constituting the conventional 2:1 switched capacitor circuit known in the art. The switched capacitor circuit is followed by a low pass filter including an inductor (L) and an output capacitor (Co). Vin is the input voltage to the regulator and Vout is the output voltage while Io represents the output current drawn by the load circuit. In the conventional 2:1 switched capacitor converter without an inductor, the flying capacitor is normally balanced at half the input voltage during normal operation of the circuit. The existence of an inductor (L) between the flying capacitor (Cf) and the output capacitor (Co) in the voltage regulator device shown in FIGS. 6A-B allows the voltage on the flying capacitor (Cf) to deviate from the normal value (i.e., 0.5 Vin) as the inductor can support arbitrary voltage drops on it.

FIG. 6A shows the first phase of the voltage regulator operation in which the flying capacitor (Cf) is charging through the input source. In this case, the two MOSFET switches S1 and S3 are turned on by biasing them at a constant driving voltage (Vd). Switches S2 and S4 are turned off, as indicated by dashed lines. FIG. 6B shows the second phase of the voltage regulator operation in which the flying capacitor (Cf) is discharging through the inductor (L). In this case, the two MOSFET switches S2 and S4 are turned on by biasing them at a constant driving voltage (Vd). Switches S1 and S3 are turned off, as indicated by dashed lines.

Figure 7A:
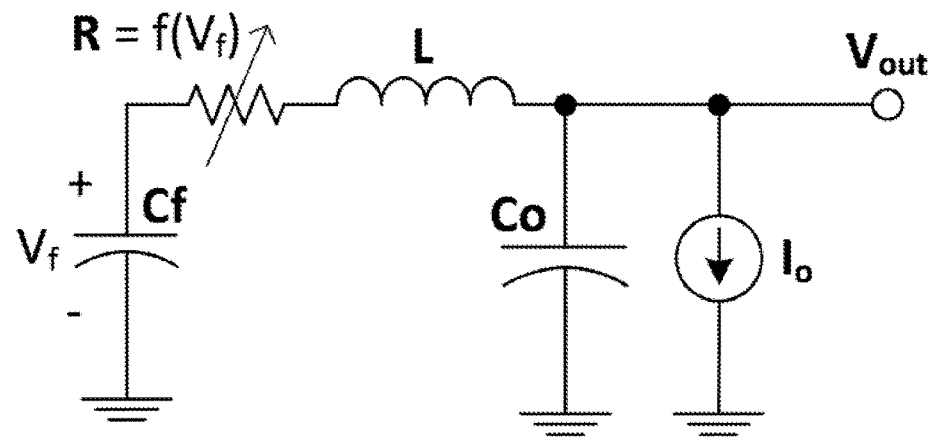
FIGS. 7A-B show the equivalent models of the circuits in FIG. 6A-B, respectively.
Figure 7B:
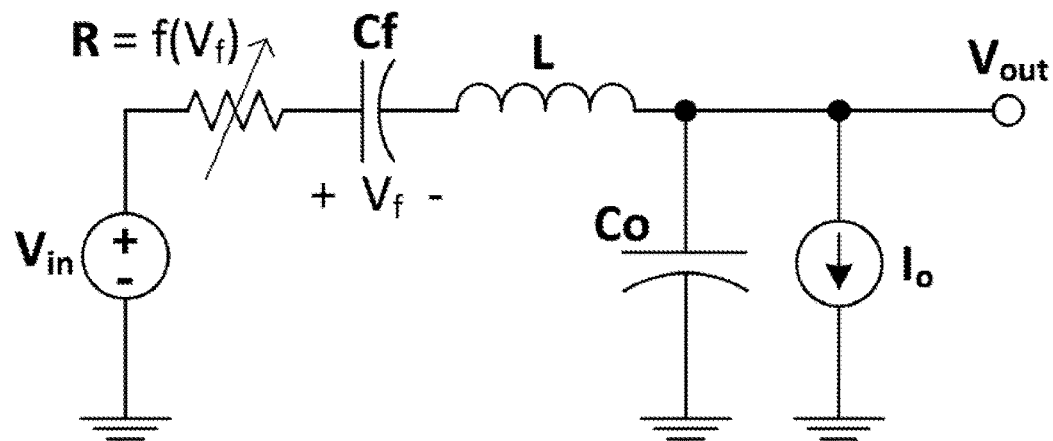

FIGS. 7A-B show the equivalent model of the circuits in FIG. 6A-B, respectively. Controlling the on-resistance of the MOSFET through the duty cycle controls the voltage drop exhibited on the MOSFET and hence the output voltage (Vout). FIGS. 7A and 7B are schematic circuits that illustrate a model of two phases 2:1 switched capacitor circuit with resistance modulation, according to an embodiment of the invention. R=f(Vf) represents the on-resistance of the switch which is a function of the voltage on the flying capacitor (Vf). As the flying capacitor voltage changes, the on-resistance of the MOSFET increases or decreases according to the position of that MOSFET in the circuit. Cf is the flying capacitor, Co is the output capacitor, L is the inductor, Io is the output current drawn by the load circuit.

Figure 8A:
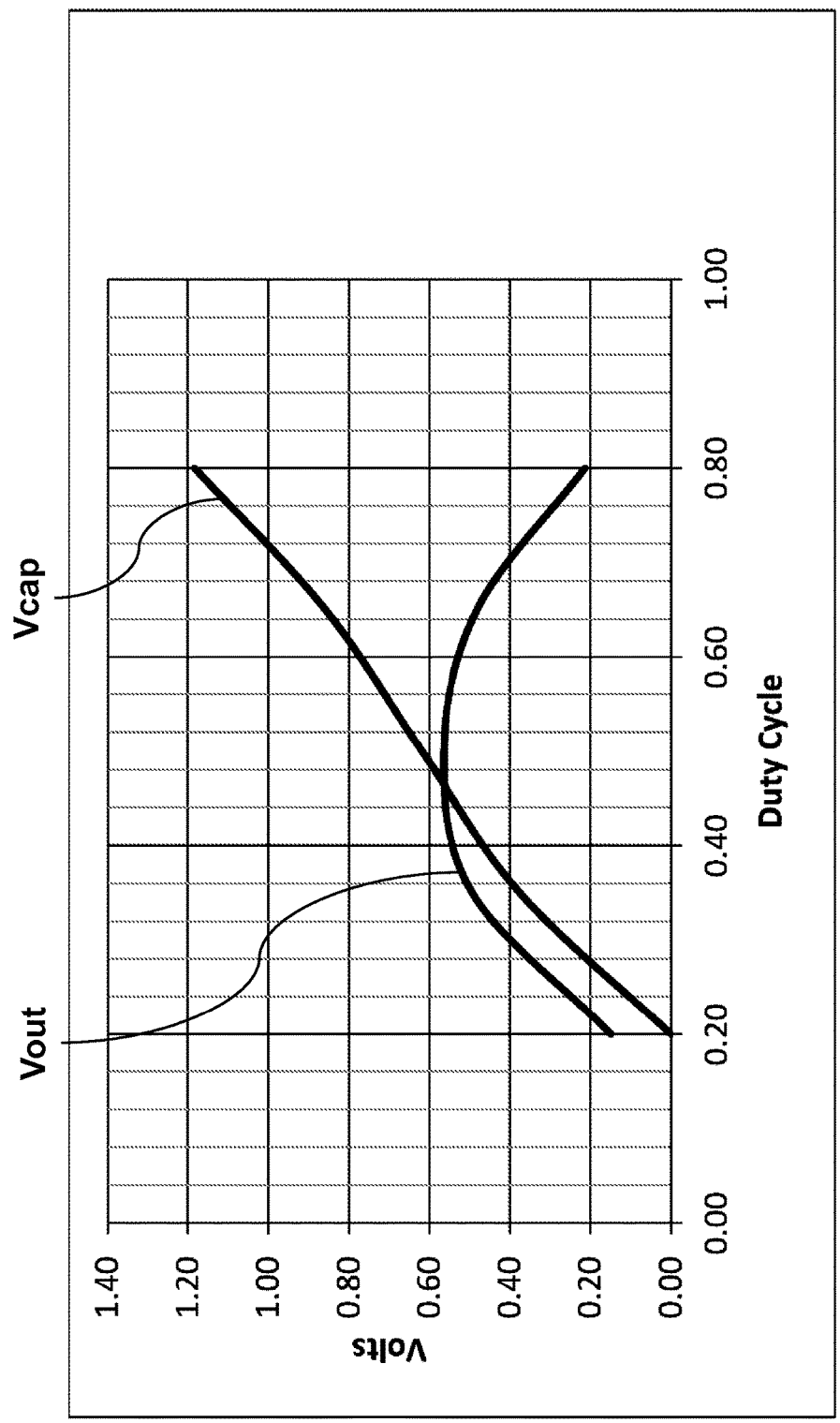
FIG. 8A is a graph of average voltage on the flying capacitor (Vf) and the output voltage (Vout) versus the duty cycle, corresponding to the circuits shown in FIGS. 6A-B.

FIG. 8A is a graph of simulation results representing the average voltage on the flying capacitor (Vf) and the output voltage (Vout) versus the duty cycle, corresponding to the circuits shown in FIGS. 6A-B. The maximum output voltage is obtained when the duty cycle is equal to 0.5. When the duty cycle deviates from 0.5, Vf deviates from 0.5 Vin, resulting in higher on-resistance for the MOSFETs, and hence the output voltage starts to scale down below 0.5 Vin. Therefore, the output voltage is controlled through a duty cycle which controls the on-resistance of the switches. This technique simplifies the driving scheme of the switches in the switched capacitor converters and allows for the use of a constant gate voltage to drive the floating switches which are not connected to either Vin or ground nodes such as switches S2 and S3. This technique allows also for the use of the duty cycle as the main controlling parameter for the output voltage instead of the switching frequency used in normal switched capacitor circuits which is a lossy regulation scheme.

Figure 8B:
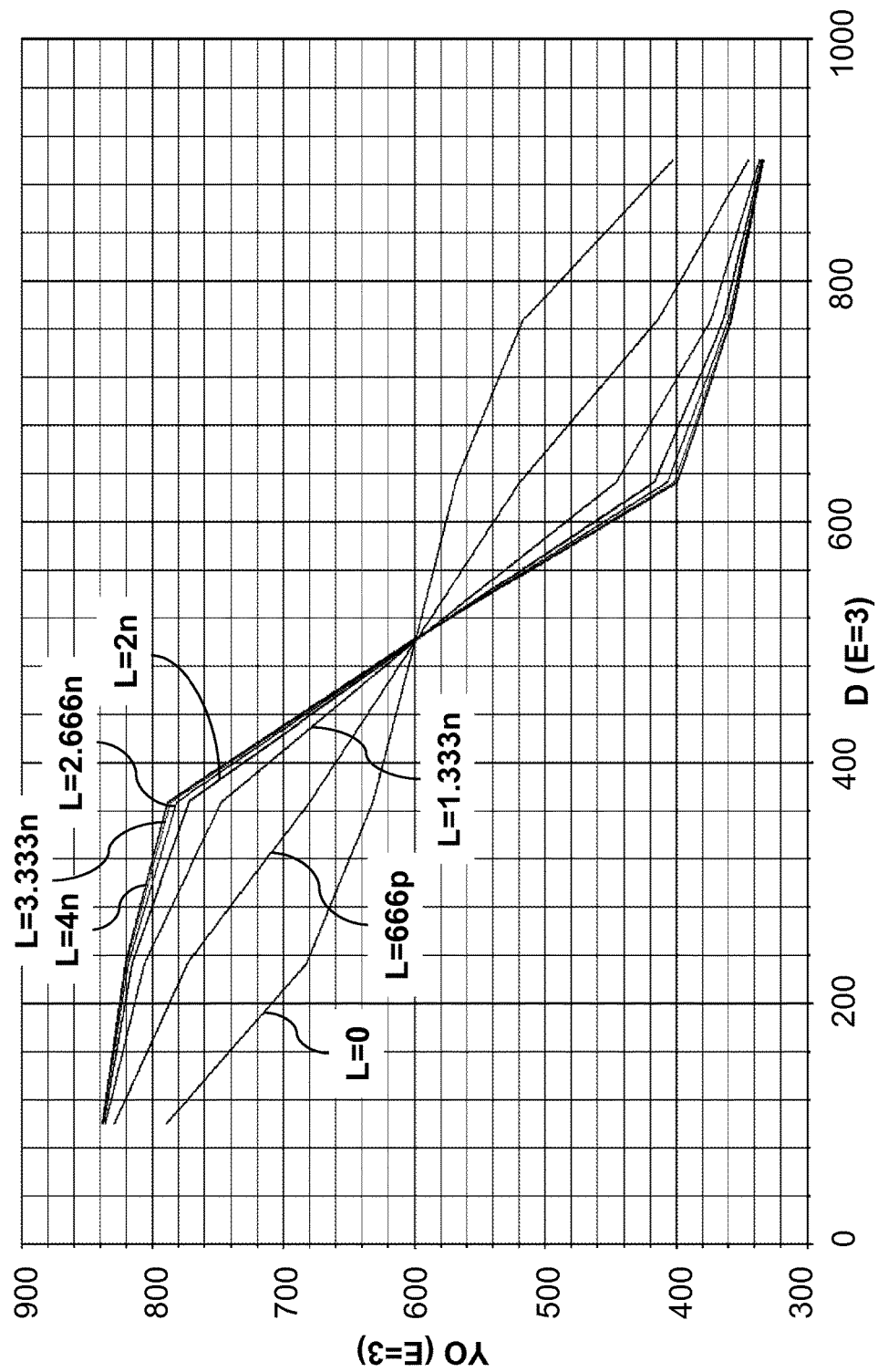
FIG. 8B is a graph of average voltage on the flying capacitor versus the duty cycle of the waveforms controlling the switches for different values of inductor size, according to an embodiment of the invention.

FIG. 8B is a graph of simulation results representing the average voltage on the flying capacitor versus the duty cycle of the waveforms controlling the switches for an input voltage equal to 1V for different values of inductor size, according to an embodiment of the invention. The relation is plotted for different values for the inductor L in FIG. 6A-B. The flying capacitor is balanced at 0.5 V (i.e., 0.5 Vin) when the duty cycle is equal to 0.5. The voltage on the flying capacitor starts deviating from 0.5 Vin once the duty cycle deviates from 0.5. This occurs due to the existence of an inductor L between the output capacitor (Co) and the flying Capacitor (Cf) as shown in FIG. 7A and FIG. 7B, which allows the voltage on the flying capacitor (Vf) to deviate from 0.5 Vin if its charging and discharging time are not equal. In this case, the voltage on the flying capacitor (Vf) can be adjusted by changing the duty cycle of the waveforms used to drive the four switches and becomes a function in the duty cycle. The dependency of the flying capacitor voltage on the duty cycle increases as the inductance value increases as shown in FIG. 8B.

The flying capacitor voltage (Vf) determines the overdrive voltage (Vov) of the turned on switches in each phase and hence their on-resistance. For example, the overdrive voltage (Vov) for switch S3 in the first phase in FIG. 6A is a function in the flying capacitor voltage (Vf) and is given by Vov=Vgs−Vth=Vd−Vin+Vf−Vth, where Vth is the threshold voltage of the MOSFET. Accordingly, the on-resistance of the MOSFET S3 is given by:

$$R_{on} = \frac{1}{K(W/L)(V_{gs} - V_{th})} = \frac{1}{K(W/L)(V_d - V_{in} + V_f - V_{th})} = f(V_f)$$

where K is a constant related to the MOSFET technology and W and L are the width and the length of the MOSFET, respectively. The same applies for the switch S2 in the second phase in FIG. 6B. Since the flying capacitor voltage (Vf) is a function in the duty cycle value (D), as illustrated in FIG. 8A and FIG. 8B, the on-resistance of the MOSFETs becomes a function in the duty cycle as well. Therefore, the on-resistance of the MOSFETs is modulated using a duty cycle value.

Figure 9:
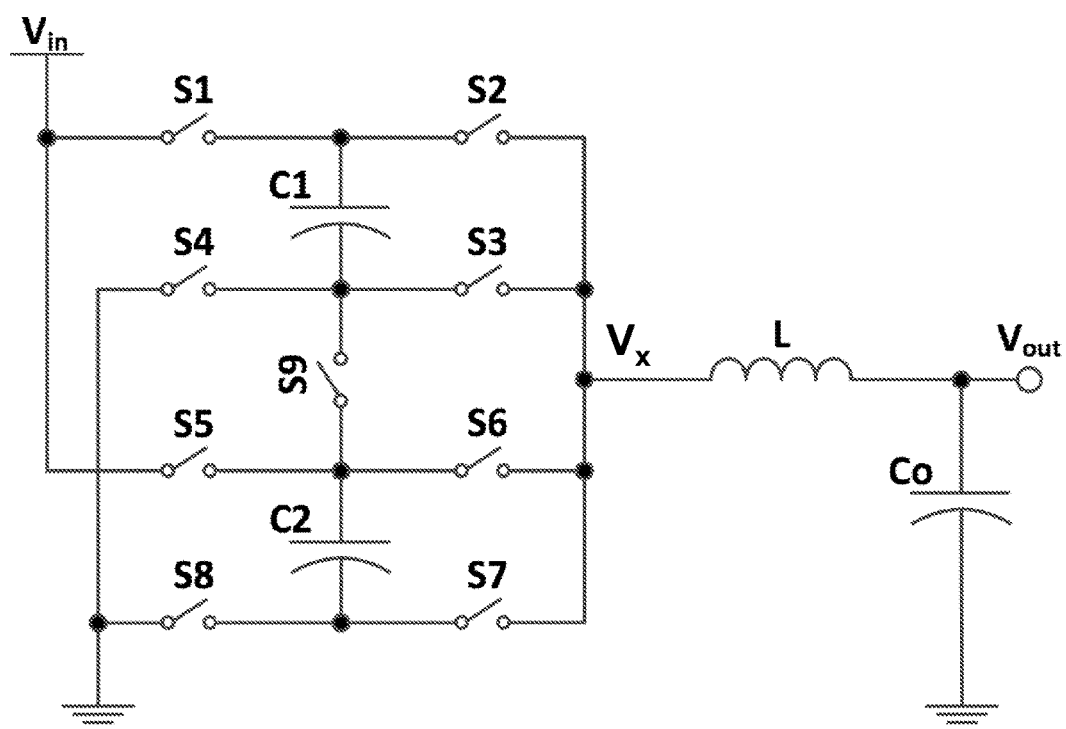
FIG. 9 is a schematic circuit diagram illustrating an example of a 4-level 4-state voltage regulator device, according to an embodiment of the invention.

FIG. 9 is a schematic circuit diagram illustrating an example of a 4-level 4-state voltage regulator device with a switched capacitor circuit capable of providing four different voltage levels connected to a low pass filter, according to an embodiment of the invention. The conventional triple-ratio SCC topology (or series-parallel topology) known in the art may be selected as a SCC to build a multilevel multistate voltage regulator device where all guidelines and techniques introduced previously are applied. The resulting regulator is a 4-level 4-state voltage regulator.

This 4-level 4-state hybrid voltage regulator includes a switched capacitor circuit capable of providing four voltage levels (Vin, 0.67 Vin, 0.33 Vin, 0) by using different configuration for the switches. The switched capacitor circuit is followed by a low pass filter. In this specific illustrative embodiment, the maximum number of states for any conversion ratio to be able to provide a stable output voltage is two. The operation region is determined based on the two voltage levels where the desired output voltage point lies in between. The switched capacitor circuit switches between these two voltage levels periodically and the duration of each voltage level is used to regulate the output voltage. In order to reduce the number of switching MOSFETs and to increase the effective switching frequency, the phases of the different voltage levels are interleaved under conditions and guidelines outlined in FIG. 5. The maximum voltage drop on the inductor is limited to one third of the input voltage allowing for a smaller inductor size. Moreover, using the pre-mentioned method, the total number of switching MOSFETs per one cycle is reduced roughly by half compared to the conventional circuit allowing for lower switching losses which can be seen as an increase in the effective switching frequency.

The 4-level 4-state voltage regulator of FIG. 9 has a series-parallel SCC topology followed by a LPF. The SCC has two flying caps (C1 and C2) and nine switches (S1, . . . , S9) and is capable of providing four voltage levels at its output. These four voltage levels are the input voltage Vin, two third the input voltage (⅔)Vin, one third the input voltage (⅓)Vin and the ground. The Vin voltage level is provided by a direct connection between the input node Vin and switching node Vx, where no flying caps are involved in the charge transferring process. This direct connection can be achieved by enabling switches S1 and S2 or enabling switches S5 and S6 or enabling both.

The (⅔) Vin voltage level is provided by two phases from the SCC where the two flying capacitors are involved in the charge transferring process. In the first phase, switches S1, S3, S5 and S7 are enabled resulting in the two flying capacitors connected in parallel and being charged through the input source. In the second phase, switches S2, S8 and S9 are enabled resulting in the two flying capacitors connected in series and being discharged through the inductor (L). The relative duration between the two phases providing the (⅔) Vin are adjusted so that the two flying capacitors (C1 and C2) are balanced at one third the input voltage Vin. The optimum value in this case is found to be that the duration of the first phase in which C1 and C2 are charging is double the duration of the second phase in which C1 and C2 are discharging.

The (⅓)Vin voltage level is provided by two phases from the SCC where the two flying capacitors (C1 and C2) are involved in the charge transferring process. In the first phase, switches S1, S7 and S9 are enabled resulting in the two flying capacitors connected in series and being charged through the input source. In the second phase, switches S2, S4, S6 and S8 are enabled resulting in the two flying capacitors connected in parallel and being discharged through the inductor (L). The relative duration between the two phases providing the (⅓)Vin are adjusted so that the two flying capacitors (C1 and C2) are balanced at one third the input voltage Vin. The optimum value in this case is found to be that the duration of the first phase in which C1 and C2 are charging is half the duration of the second phase in which C1 and C2 are discharging.

The ground voltage level is provided by a direct connection between ground node and switching node Vx of the SCC where no flying capacitors are involved in the charge transferring process. This direct connection can be achieved by enabling switches S4 and S3 or enabling switches S7 and S8 or enabling both.

FIG. 10 is a table illustrating the three different operation regions of the 4-level 4-state voltage regulator device after applying the phase interleaving method, according to an embodiment of the invention. In each of the three operation regions, the operation timeline of the circuit is divided into four time slots (i.e., states) T1, T2, T3 and T4. The odd time slots (T1 and T3) are assigned to phases of the first voltage level while the even time slots (T2 and T4) are assigned to phases of the second voltage level based on the general operation timeline illustrated in FIG. 4B.

In the first operation region, the SCC is configured to periodically switch its output between Vin and (⅔)Vin. In the second operation region, the SCC is configured to periodically switch its output between (⅔)Vin and (⅓)Vin. In the third operation region, the SCC is configured to periodically switch its output between (⅓)Vin and zero. The proper operation region is selected based on the desired output voltage as shown in the table of FIG. 10.

The table of FIG. 10 gives an indication of the switching losses associated with the switching behavior of the MOSFETs in the 4-level 4-state voltage regulator. Inside each operation region, when going from one phase to the next, some switches change their status from ON to OFF or vice versa, some remain ON and some remain OFF. The right arrows in the table indicate a switch changing its status when going from one phase to the next. Having a SCC changing its output voltage periodically between two voltage levels along with the interleaving between the phases of these two voltage levels result in reduced switching losses of the regulator. It can be noted from FIG. 10 that not all the switches of the SCC change their status when going from one phase to the next. In contrast, FIG. 11 is a table illustrating the different operation regions of a conventional triple-ratio SCC known in the art.

From a comparison of FIGS. 10 and 11, it is seen that, on the one hand, during a full cycle in the first operation region of the 4-level 4-state voltage regulator of the present invention (FIG. 10) there are 14 switches changing their status (i.e., number of right arrows in first operation region). On the other hand, the number of switches changing their status during a full cycle of the conventional triple-ratio SCC operating at (⅔)Vin voltage level (FIG. 11) is 28 (number of right arrows in Vo=0.67 Vin region). Therefore, the 4-level 4-state voltage regulator of the present invention can result in lower switching losses.

Figure 12A:
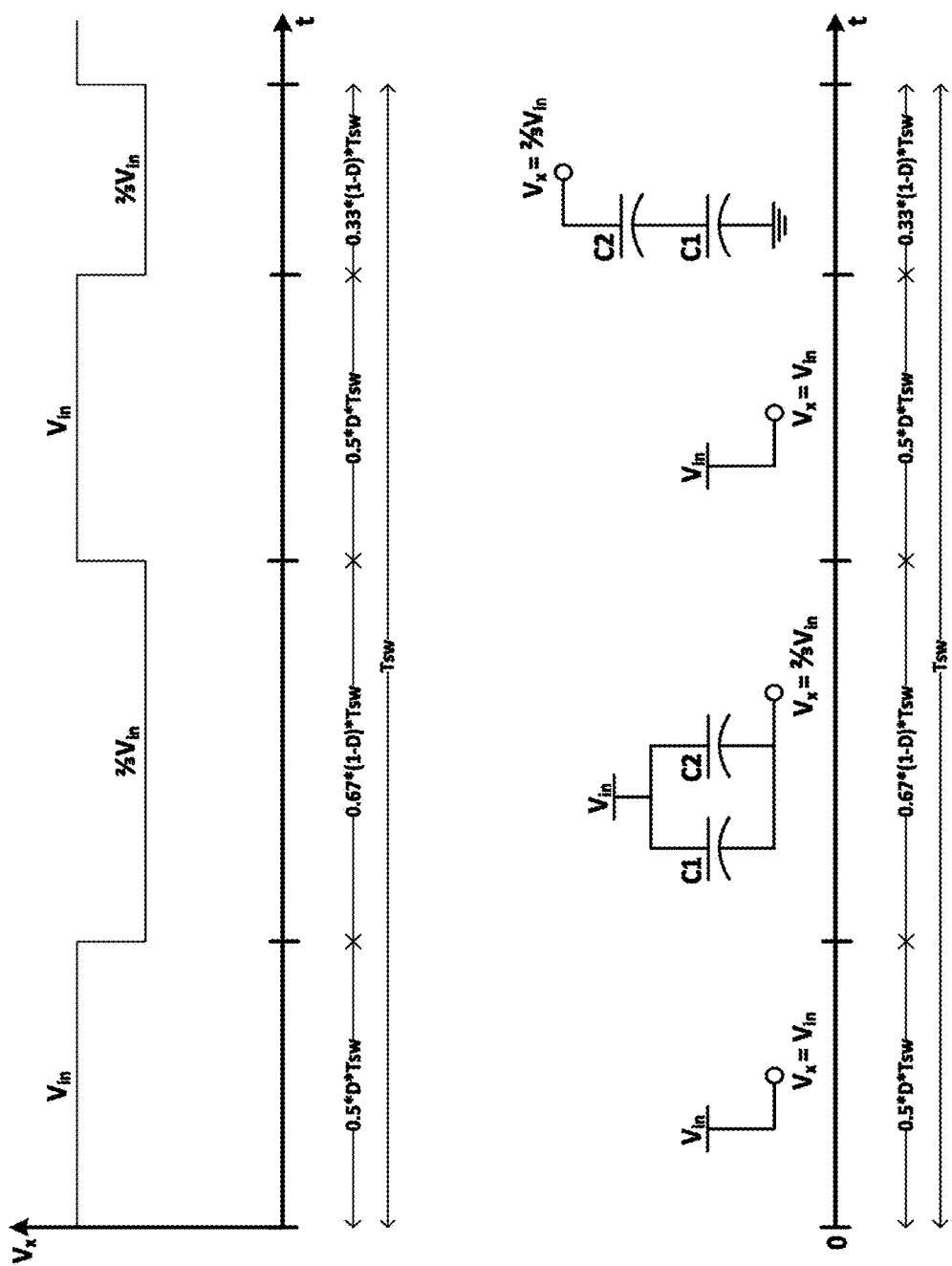
FIGS. 12A-C are timing diagrams showing different configurations of a switched capacitor circuit and the resulting voltage waveform in the first, second, and third operation regions of the 4-level 4-state voltage regulator of FIG. 9.
Figure 12B:
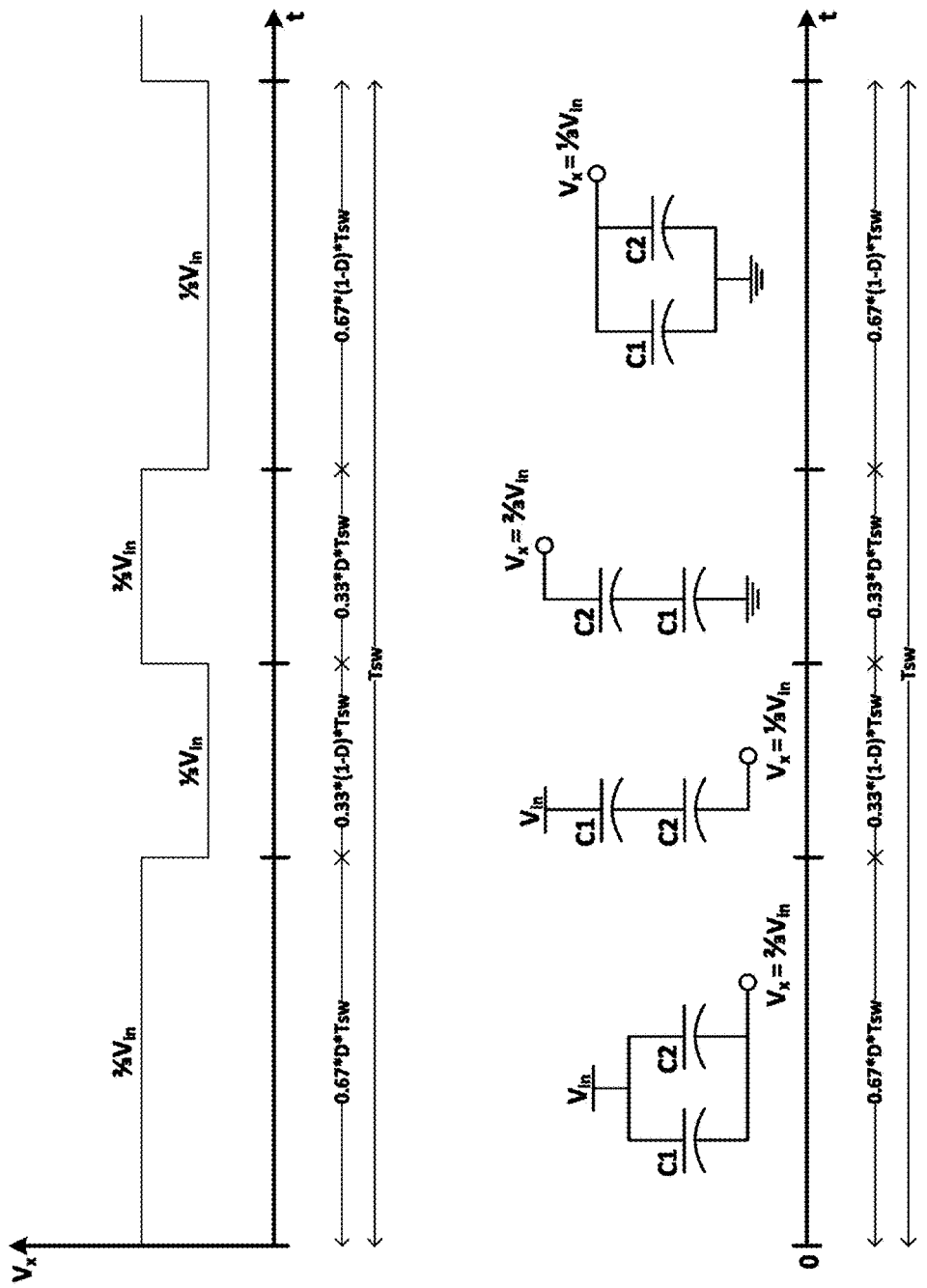
Figure 12C:
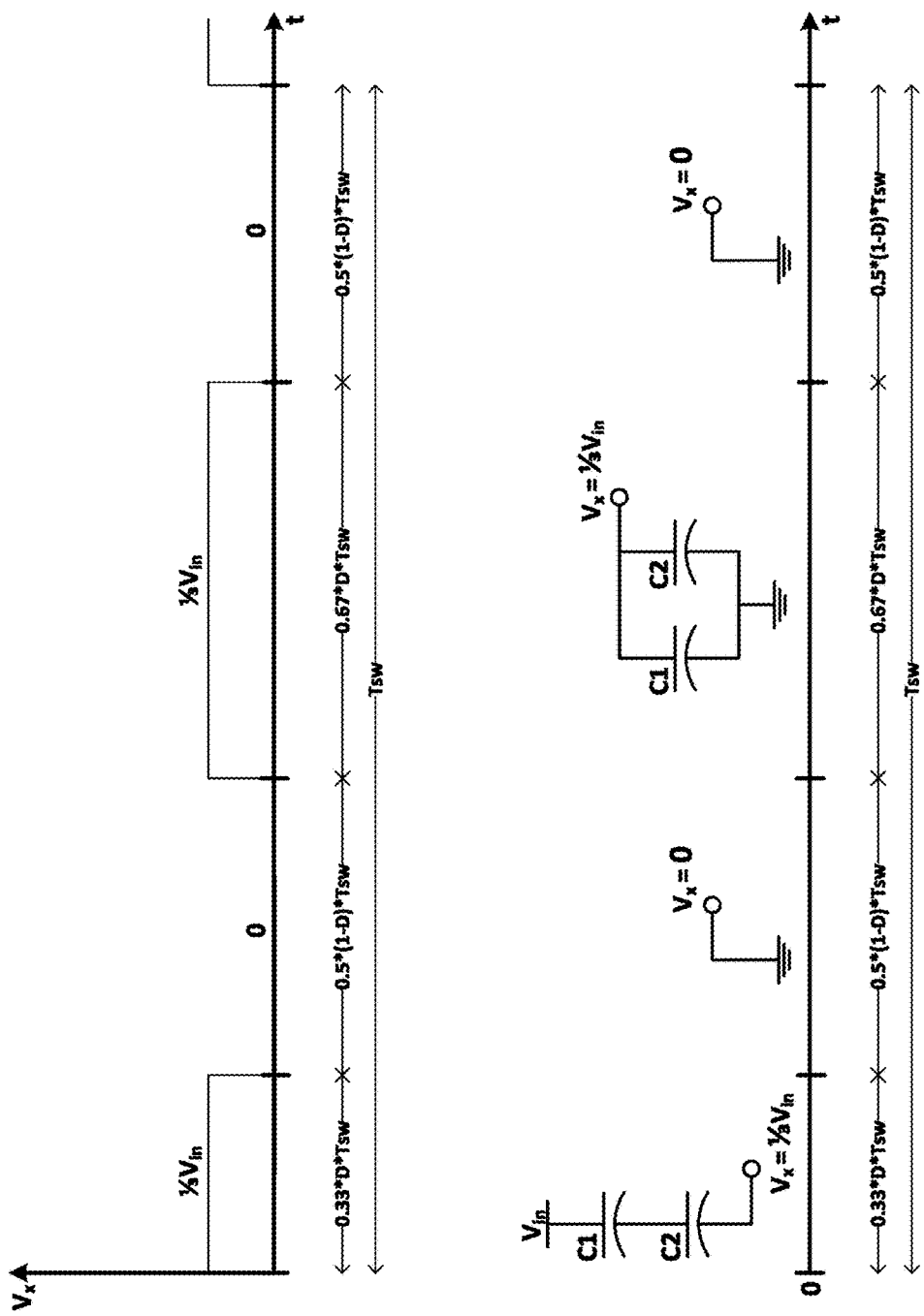

FIGS. 12A-C are timing diagrams showing different configurations of a switched capacitor circuit and the resulting voltage waveform in the first, second, and third operation regions of the 4-level 4-state voltage regulator, according to an embodiment of the invention. In the first operation region (FIG. 12A), the two phases of the Vin voltage level are interleaved with the two phases of the (⅔)Vin voltage level (i.e., the odd time slots are assigned to phases of Vin voltage level while the even time slots are assigned to phases of (⅔)Vin voltage level). The correspondent timeline of the first operation region is shown in FIG. 12A along with the resulting Vx waveform at the SCC output. The equivalent circuit of the SCC in each time slot is also shown. The total duration of the Vin voltage level during a full switching cycle (Tsw) is equal to DTsw while the total duration of the (⅔)Vin voltage level is equal to (1−D)Tsw. By adjusting the duty cycle value (D), a fine tuning of the output voltage value inside that operation region can be achieved. The output voltage (Vout) in this case is given by Vout=(⅔)Vin+ D(⅓)Vin. The relative duration between the two phases of the (⅔)Vin voltage level is kept at the optimum value described previously (i.e., the duration of the first phase is double the duration of the second phase) in order to maintain the voltage on the two flying capacitors balanced at (⅓)Vin during the operation of the regulator.

In the second operation region (FIG. 12B), the two phases of the (⅔)Vin voltage level are interleaved with the two phases of the (⅓)Vin voltage level (i.e., the odd time slots are assigned to phases of (⅔)Vin voltage level while the even time slots are assigned to phases of (⅓)Vin voltage level). The correspondent timeline of the second operation region is shown in FIG. 12B along with the resulting Vx waveform at the SCC output. The equivalent circuit of the SCC in each time slot is also shown. The total duration of the (⅔)Vin voltage level during a full switching cycle (Tsw) is equal to DTsw while the total duration of the (⅓)Vin voltage level is equal to (1−D)Tsw. By adjusting the duty cycle value (D), a fine tuning of the output voltage value inside that operation region can be achieved. The output voltage (Vout) in this case is given by Vout=(⅓)Vin+D(⅓)Vin. The relative duration between the two phases of the (⅔)Vin voltage level is kept at the optimum value described previously (i.e., the duration of the first phase is double the duration of the second phase) to maintain the voltage on the two flying capacitors balanced at (⅓)Vin during the operation of the regulator. Similarly, the relative duration between the two phases of the (⅓)Vin voltage level is kept at the optimum value described previously (i.e., the duration of the first phase is half the duration of the second phase).

In the third operation region (FIG. 12C), the two phases of the (⅓)Vin voltage level are interleaved with the two phases of the ground voltage level (i.e., the odd time slots are assigned to phases of (⅓)Vin voltage level while the even time slots are assigned to phases of ground voltage level). The correspondent timeline of the third operation region is shown in FIG. 12C along with the resulting Vx waveform at the SCC output. The equivalent circuit of the SCC in each time slot is also shown. The total duration of the (⅓)Vin voltage level during a full switching cycle (Tsw) is equal to DTsw while the total duration of the ground voltage level is equal to (1−D)Tsw. By adjusting the duty cycle value (D), a fine tuning of the output voltage value inside that operation region can be achieved. The output voltage (Vout) in this case is given by Vout=D(⅓)Vin. The relative duration between the two phases of the (⅓)Vin voltage level is kept at the optimum value described previously (i.e., the duration of the first phase is half the duration of the second phase) to maintain the voltage on the two flying capacitors balanced at (⅓)Vin during the operation of the regulator.

Figure 13:
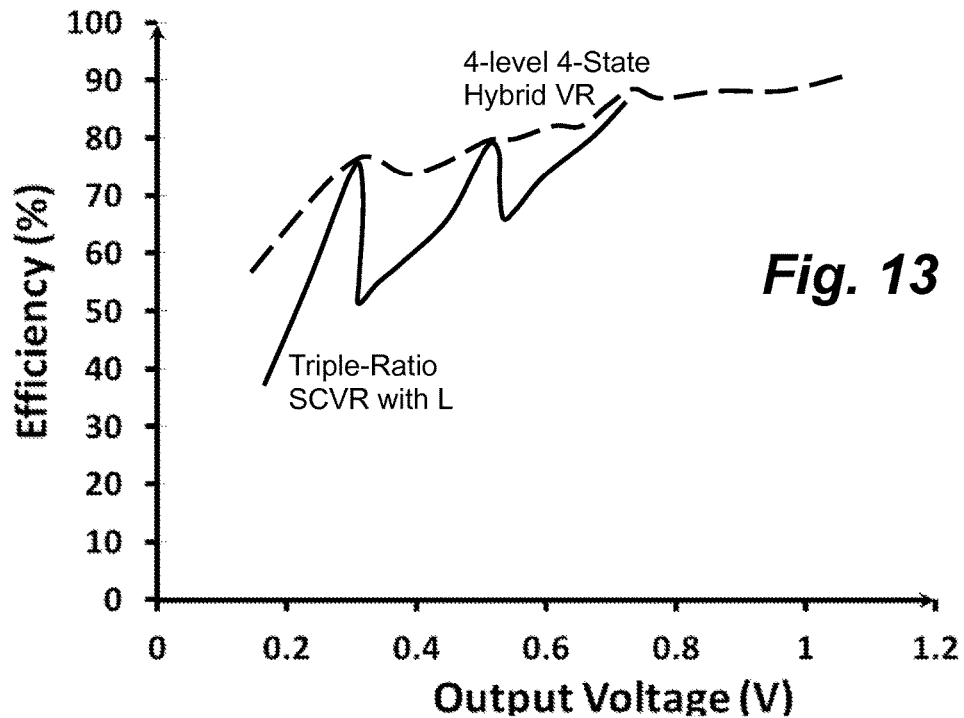
FIG. 13 is a graph of efficiency vs. output voltage showing a comparison between the 4-level 4-state voltage regulator of FIG. 9 and a conventional triple-ratio resonant switched capacitor regulator.

FIG. 13 is a graph of efficiency vs. output voltage showing a comparison between 4-level 4-state voltage regulator and a conventional triple-ratio resonant switched capacitor regulator, according to an embodiment of the invention. Both converters are implemented on a standard CMOS technology with an input voltage of 1.2 V. The 4-level 4-state device has higher efficiency than the conventional triple-ratio SCC. More specifically, the 4-level 4-state voltage regulator efficiency does not degrade quickly as the output voltage scales down, due to the efficient regulation scheme that is based on the pulse width modulation instead of the frequency modulation used in the conventional switched capacitor converters which is a lossy regulation scheme. Moreover, the phase interleaving technique, applied in the 4-level 4-state voltage regulator, results in an increased effective switching frequency and reduced switching losses as discussed previously.

Figure 14:
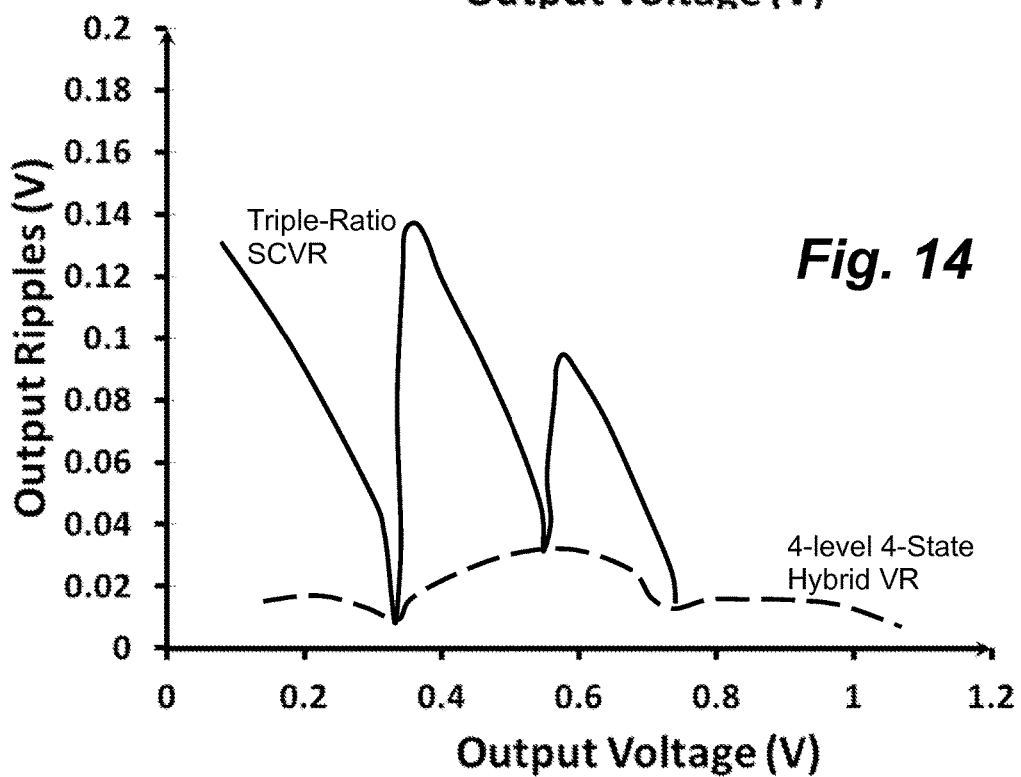
FIG. 14 is a graph of output ripples vs. output voltage showing a comparison between 4-level 4-state voltage regulator of FIG. 9 and a conventional triple-ratio resonant switched capacitor regulator.

FIG. 14 is a graph of output ripples vs. output voltage showing a comparison between 4-level 4-state voltage regulator and a conventional triple-ratio resonant switched capacitor regulator in terms of output voltage ripples, according to an embodiment of the invention. The output ripples of the conventional triple-ratio topology increases substantially once deviating from the three normal operating points. On the other hand, the output ripples of the 4-level 4-state voltage regulator are kept low during most of the output voltage range.

Figure 15:
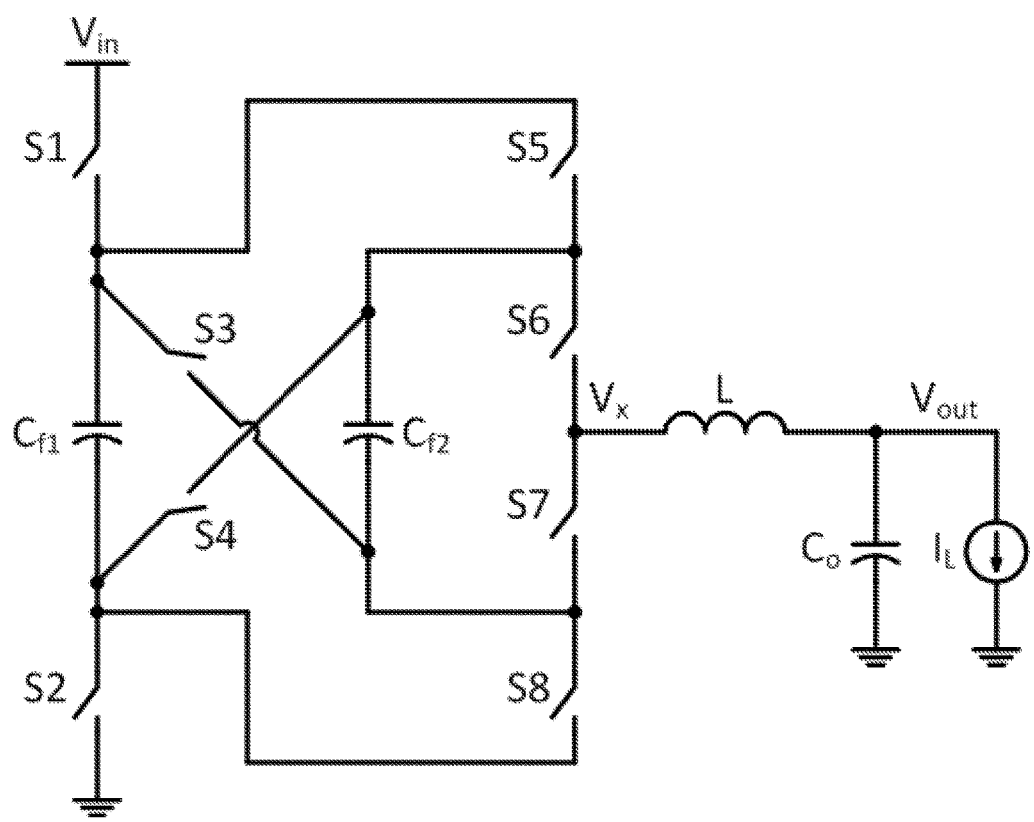
FIG. 15 is schematic circuit diagram of a 5-level 8-state voltage regulator device, according to an embodiment of the invention.

FIG. 15 is schematic circuit diagram illustrating an illustrative embodiment of a 5-level 8-state voltage regulator device with a switched capacitor circuit capable of providing five voltage levels connected to a low pass filter, according to an embodiment of the invention. This 5-level 8-state hybrid voltage regulator has a SCC topology followed by a LPF. The SCC has two flying capacitors (Cf1 and Cf2) and eight switches (S1, . . . , S8). It is capable of providing five voltage levels at its output. These five voltage levels are Vin, 0.75 Vin, 0.5 Vin, 0.25 Vin, and the ground voltage levels. Each of these voltage levels can be provided by one or more different configurations of switches shown in the table in FIG. 16. Each configuration results in a certain connection between the two flying capacitors, input (or ground) node and Vx node where each of the two flying capacitors is either charging (up-arrow), discharging (down-arrow) or idle (i.e. floating) as indicated in the table in FIG. 16. It can be noted that the "Vin" and ground voltage levels are provided by direct connection between power supply rails and Vx node. The maximum number of phases to provide any of the five voltage levels is four, therefore a one switching cycle is divided into eight time slots (i.e., states). The average voltages on the flying capacitors Cf1 and Cf2 during normal operation of the circuit are 0.5V in and 0.25 Vin, respectively. This can be proved by solving the KVL equations of the configurations providing each of the five voltage levels. By following the guidelines and the conditions mentioned in FIG. 5, the flying capacitors are balanced at 0.5 Vin and 0.25 Vin, respectively, as the SCC goes from one state to another.

FIG. 16 is a table illustrating the different operation regions of the 5-level 8-state voltage regulator device using a phases interleaving method, according to an embodiment of the invention. There are four different operation regions depending on where the desired output voltage (Vo) lies. In the first operation region, the SCC is changing its configuration periodically so that the Vx waveform at the output of the SCC is switching between Vin and 0.75 Vin. Similarly, the Vx waveform switches its voltage level periodically between the two voltage levels of each operation region. Selecting the required operation region is considered a coarse tuning of the output voltage Vo. Fine tuning of output voltage value Vo inside each operation region is done by controlling the relative duration between the two voltage levels of the Vx waveform through the adjustment of a duty cycle value.

In each of the four operation regions, the operation timeline of the circuit is divided into eight time slots (i.e., states) T1, . . . , T8. The odd time slots T1, T3, T5, T7 are assigned to phases of the first voltage level while the even time slots T2, T4, T6, T8 are assigned to phases of the second voltage level based on the general operation timeline illustrated in FIG. 4B. The durations of the even and odd time slots are given by T1=T3=T5=T7=0.25 DTsw, T2=T4=T6=T8=0.25(1−D)Tsw, T1+T2+T3+T4+T5+T6+T7+T8=Tsw, where D is the duty cycle and Tsw is the duration of one switching cycle. The table in FIG. 16 gives a summary of the circuit operation showing switch configurations assigned to different time slots of a switching cycle inside each operation region. The switch configurations are assigned in a way that ensures the circuit functionality and satisfies the guidelines of FIG. 5.

Figure 17A:
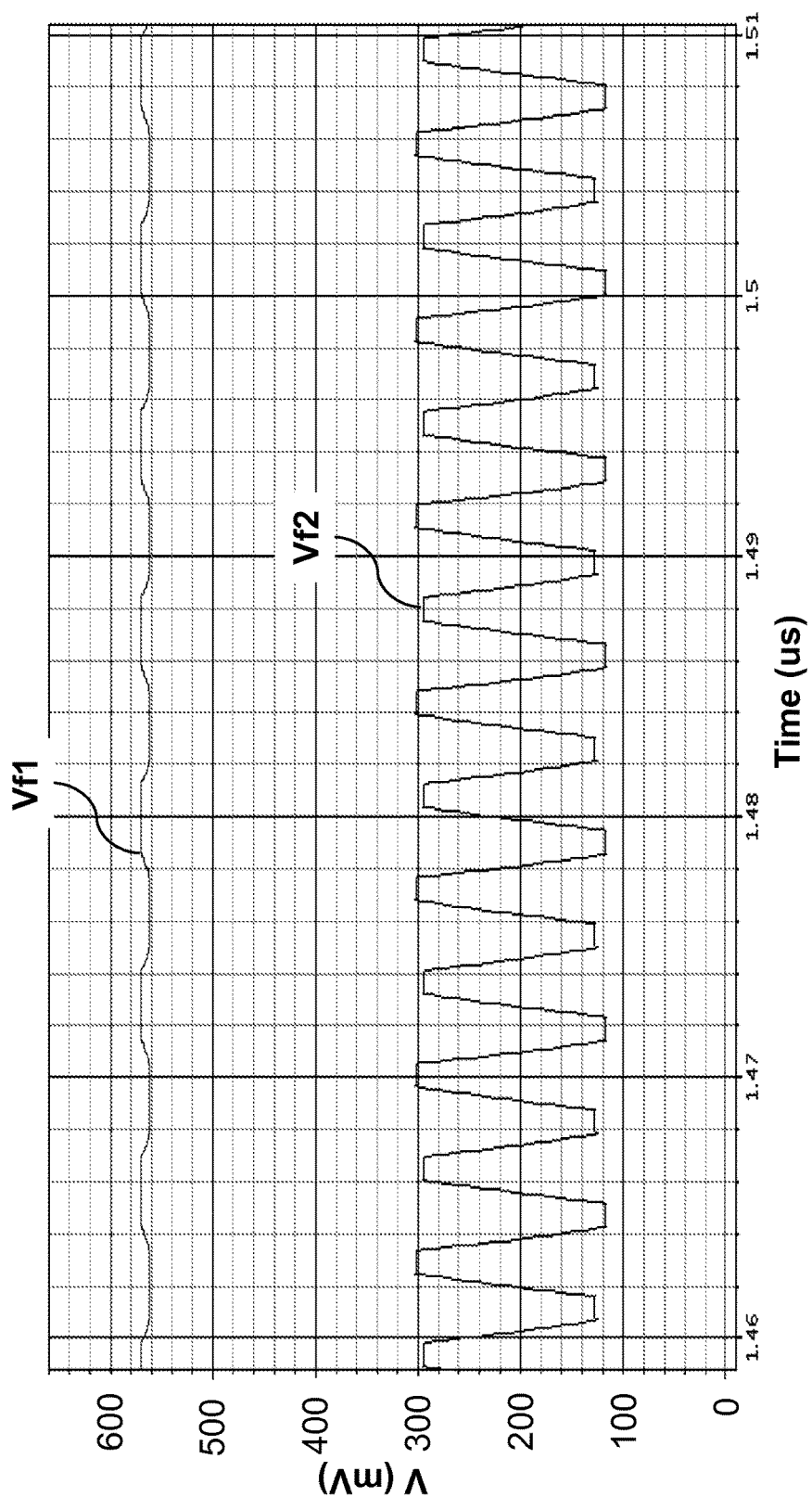
FIG. 17A is a graph of the voltage on the flying capacitors vs. time for the circuit of FIG. 15.
Figure 17B:
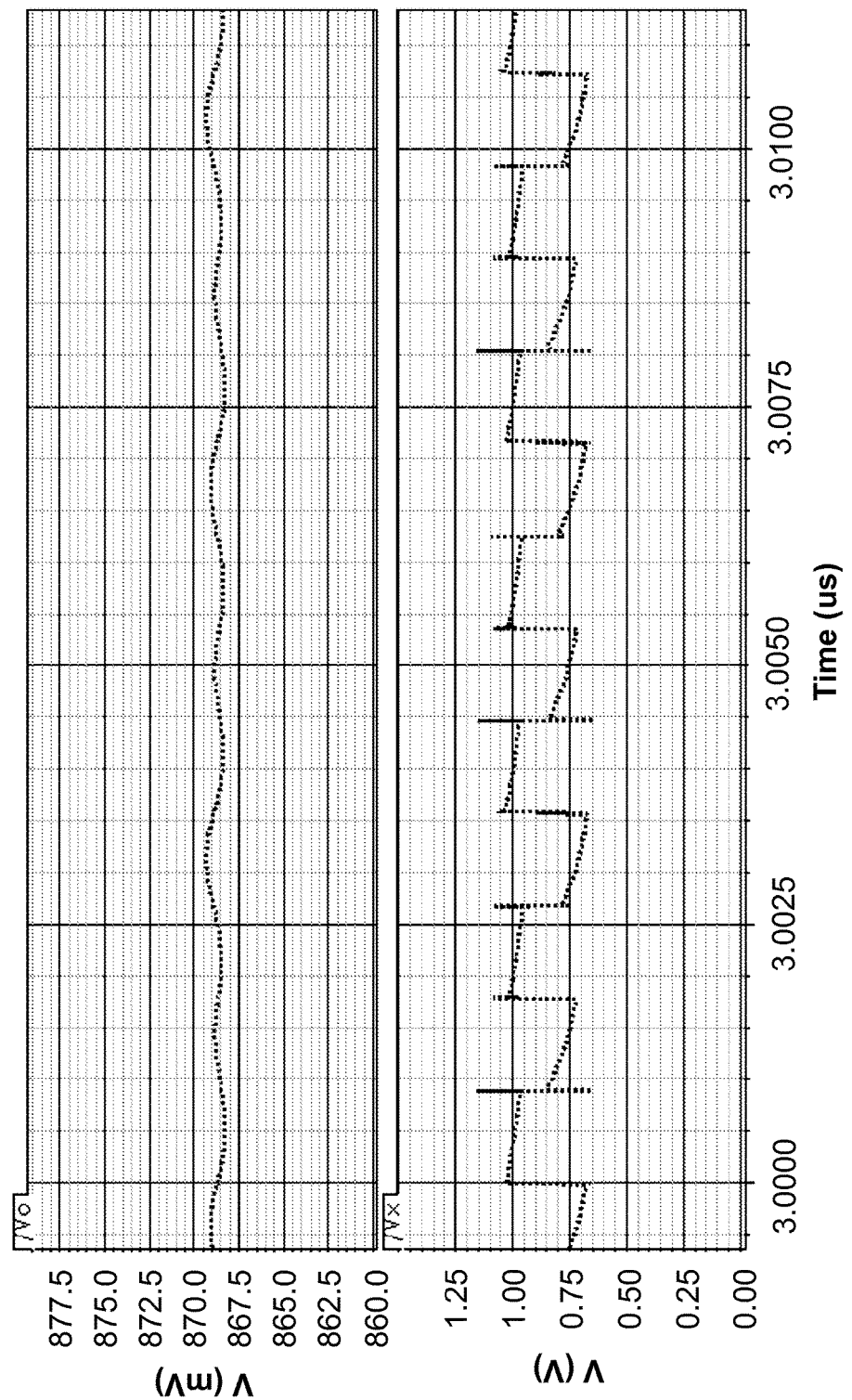
FIG. 17B is graph of the voltage Vout at the device output node vs. time (top) and the voltage Vx at the SCC switching output node vs. time (bottom), for the 5-level 8-state voltage regulator circuit shown in FIG. 15.

FIG. 17A-B show simulation result from a 5-level 8-state voltage regulator circuit in FIG. 15 built on a standard CMOS technology with an input voltage of 1V.

FIG. 17A is a graph of the voltage on the flying capacitors vs. time, showing the voltage Vf1 on the flying capacitor Cf1 and the voltage Vf2 on the flying capacitor Cf2 in the circuit of FIG. 15 when the voltage regulator is operated at the first operation region with the sequence shown in the table in FIG. 16 and with a duty cycle of half. The average voltage Vf1 on the flying capacitor is roughly balanced at 0.5 V (i.e., 0.5 Vin) while the average voltage on the flying capacitor Cf2 is roughly kept balanced at 0.25 V (i.e., 0.25 Vin).

FIG. 17B is graph of simulation results representing the voltage Vout at the device output node vs. time (top) and the voltage Vx at the SCC switching output node vs. time (bottom), for the 5-level 8-state voltage regulator circuit shown in FIG. 15 when the regulator is operated in the first operation region with the sequence shown in the table in FIG. 16 and with a duty cycle of half. The Vx node is switching its voltage level periodically between 1 V (i.e., Vin) and 0.75 V (i.e., 0.75 Vin) at a switching frequency which is four times the frequency of one cycle (which is equal to 1/Tsw where Tsw is the total duration of the eight time slots as explained previously). The Vin voltage level and the 0.75 Vin voltage level the Vx waveform is switching between represents the first and the second voltage levels of the first operation region described in the table in FIG. 16. The theoretical output voltage value of the converter operating in the first operation region and with a duty cycle of half is Vout=0.75 Vin+0.25 VinD=0.75 Vin+0.125 Vin=0.875 Vin, which is equal to 0.875 V for an input voltage of 1 V. However, the output voltage value shown in FIG. 17B is slightly lower than 0.875 V due to the losses exhibited in the regulator circuit.

Figure 18:
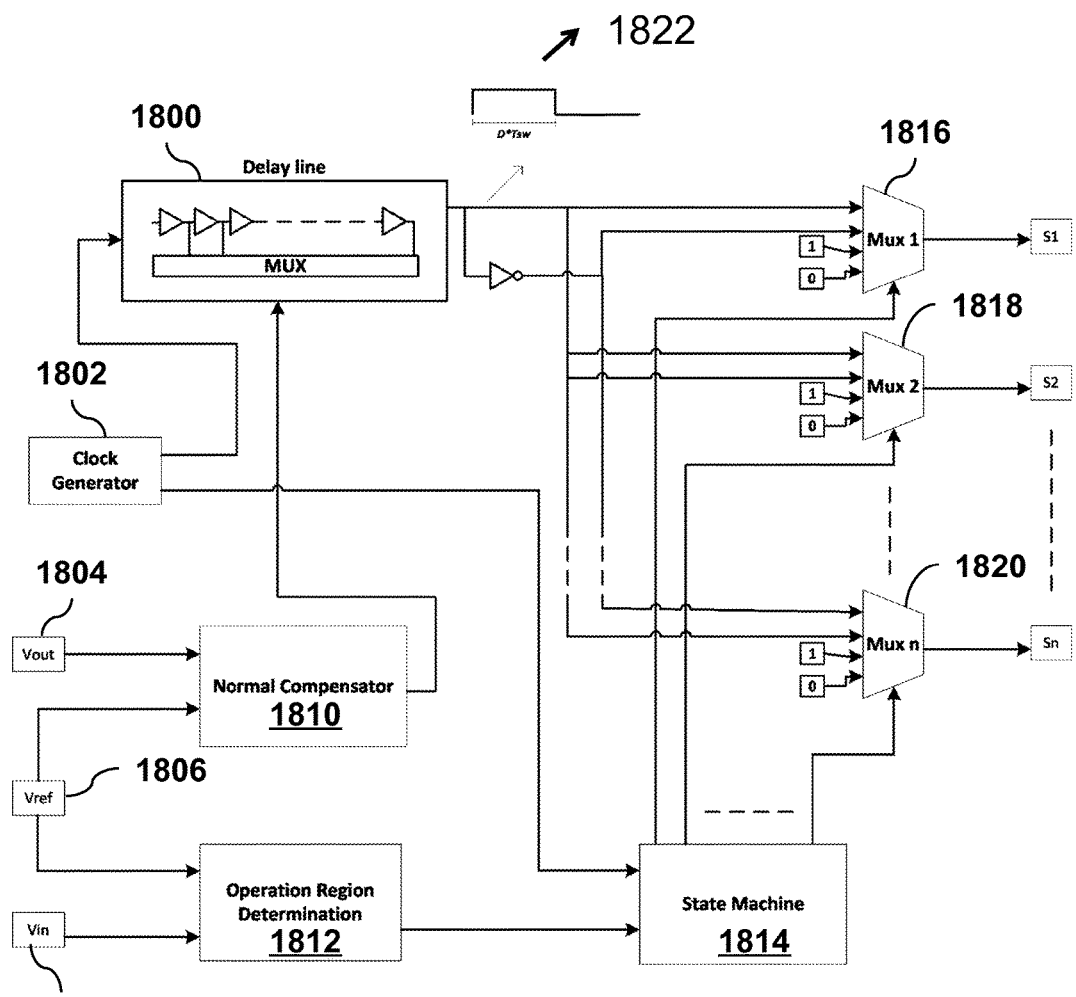
FIG. 18 is a schematic circuit diagram illustrating the structure of a controller unit and its working principle, according to an embodiment of the invention.

FIG. 18 is a schematic circuit diagram illustrating the structure of a controller unit and its working principle, according to an embodiment of the invention. The control unit is capable of providing different switch driving waveforms to control the operation of a switched capacitor circuit having multiple phases and regulate the output voltage. A state machine device with a lookup table determines the configuration of each switch in a certain phase and switches between these configurations when going from one phase to another. The controller is capable of determining the operation region as well.

As detailed in FIG. 18, the digital controller is used to control a voltage regulator device that has a SCC with n switches as one of its parts. The voltage regulator device is capable of operating at different operation regions according to the desired output voltage. Each of these operation regions has multiple states. In each of these states, the status of each switch in the SCC is either ON or OFF. The digital control unit takes the desired reference voltage 1806, current input voltage 1808 to the regulator and current output voltage 1804 from the regulator as inputs and generates n control signals for the switches S1, S2, . . . Sn in the SCC.

The controller unit has a clock generator 1802 is used to generate the main clock signal of the system with a period equal to one over the switching frequency of the regulator (Fsw). A normal compensator block 1810 is used to adjust the dynamic response of the regulator by taking as an input the desired reference voltage value 1806 and the current output voltage value 1804 as an input and generates a duty cycle value as an output.

A delay line 1800 is used to generate a pulse width modulated signal version 1822 from the main clock signal. The delay line has a series of cascaded tapped buffers followed by multiplexers and flip flops. The delay line block takes the main system clock and the duty cycle value as an input and generates a pulse width modulated signal 1822 as an output. The high portion of the modulated signal represents the duration of one state of the SCC while the low portion of the modulated signal represents the duration of the following state.

The pulse width modulated signal and its inverse go as input to n multiplexers (1816, 1818, . . . 1820) where n is the number of the switches to be controlled in the SCC circuit. Each of the n multiplexers has two additional inputs corresponding to the logic high "1" and the logic low "0" signals. The proper operation region is determined by the operation region determination block 1812 based on the input voltage value 1808 and the desired reference voltage 1806. The output of this block goes as an input to a state machine 1814 that stores information about the different states of the regulator inside each operation region and has information about the status of the n switches inside each state of that operation region.

The state machine 1814 generates n control signals that work as the selection input for the n multiplexers. According to the status of each switch, one of the four inputs to the multiplexers is selected. If the switch is on in the first state and is off in the next phase, then the pulse width modulated signal is selected. If the switch is off in the first phase while it is on in the next phase then the inverted pulse width modulated signal is selected. If the switch is always on during the two states then the logic high (i.e. "1") is selected. If the switch is always off in the two states then the logic low "0" is selected.

The state machine 1814 has an internal counter that counts from zero until (m−1) for an operation region that consists of 2 m states. The counter and the state machine are triggered at the positive edge of the main system clock generated from 1802. Therefore, the n outputs of the state machine are updated at the positive edge of the main system clock. Once the counter reaches to (m−1) when counting, which means a full switching cycle of 2 m states is provided, the controller is reset and starts counting again from zero. This process is repeated along the operation timeline of the regulator.

The invention claimed is:
1. A voltage regulator device, comprising:
a switched capacitor circuit (SCC) comprising capacitors and switches, wherein the SCC is configured to receive an input voltage and produce at an output n different voltage levels (V1, V2, . . . , Vn) periodically with a period equal to one over a switching frequency of the voltage regulator device;
a low pass filter (LPF) directly connected to the SCC, the LPF comprising an inductor and a capacitor, wherein the LPF receives the output of the SCC at an input and produces a regulated output voltage at an output; and a control unit configured to receive a target reference voltage and a current output voltage as an input and produce driving waveforms to the switches of the SCC;

wherein a one switching cycle of operation is divided into multiple time slots wherein even time slots are assigned to phases of a first conversion ratio and odd timeslots are assigned to phases of a second conversion ratio.

2. The device of claim 1, wherein the control unit is configured to control the SCC to produce the n voltage levels (V1, V2, . . . , Vn) with different durations.

3. The device of claim 1, wherein the control unit is configured to control the SCC to change a duty cycle.

4. The device of claim 1, wherein the SCC is configured to produce the n different voltage levels (V1, V2, . . . , Vn) such that all the n different voltage levels (V1, V2, . . . , Vn) are higher than or equal to the input voltage to form a step-up regulator.

5. The device of claim 1, wherein the control unit is configured to control the SCC by controlling a relative duration between different phases to adjust an average steady state voltage on each flying capacitor in each conversion ratio of the SCC.

6. The device of claim 1, wherein the control unit is configured to control the SCC to operate on a conversion ratio having multiple phases with phase durations.

7. The device of claim 1, wherein switches in the SCC are resistance modulated by controlling a flying capacitor average voltage to alter an overdrive voltage of the switches.

8. The device of claim 1, wherein the SCC consists of two flying capacitors and nine switches.

9. The device of claim 1, wherein the SCC operates at four different conversion ratios to provide four equally spaced voltage levels at its output.

10. The device of claim 1, wherein the control unit is configured to control the SCC to switch its configuration periodically between a first conversion ratio and a second conversion ratio to produce a desired output voltage.

11. The device of claim 1, wherein the SCC consists of two flying capacitors and eight switches.

12. The device of claim 1, comprising a decision circuit to decide an operation region based on a required reference output voltage and the input voltage.

13. The device of claim 1, comprising a state machine configured to receive an operation region as an input and produce n outputs determining states of n driving waveforms using a look up table.

14. The device of claim 1, wherein the SCC is configured to produce the n different voltage levels (V1, V2, . . . , Vn) such that all the n different voltage levels (V1, V2, . . . , Vn) are lower than or equal to the input voltage to form a step-down regulator.

15. The device of claim 1, wherein the SCC is configured to produce the n different voltage levels (V1, V2, . . . , Vn) such that some of the n different voltage levels (V1, V2, . . . , Vn) are higher than the input voltage and some of the n different voltage levels (V1, V2, . . . , Vn) lower than the input voltage to form a step-up/down regulator.

16. A voltage regulator device, comprising:

a switched capacitor circuit (SCC) comprising capacitors and switches, wherein the SCC is configured to receive an input voltage and produce at an output n different voltage levels (V1, V2, . . . , Vn) periodically with a period equal to one over a switching frequency of the voltage regulator device;

a low pass filter (LPF) directly connected to the SCC, the LPF comprising an inductor and a capacitor, wherein the LPF receives the output of the SCC at an input and produces a regulated output voltage at an output; and a control unit configured to receive a target reference voltage and a current output voltage as an input and produce driving waveforms to the switches of the SCC;

wherein a one switching cycle of operation is divided into four time slots wherein even time slots are assigned to phases of a first conversion ratio and odd timeslots are assigned to phases of a second conversion ratio.

* * * * *